PEN SPEED ANTICIPATING CIRCUIT

Filed Dec. 29, 1961 18 Sheets-Sheet 1

INVENTORS.
LEO E. RAINVILLE Jr.
JOHN R. MORRIS,
BY
Walter J. Odam
ATTORNEY.

Sept. 15, 1964 J. R. MORRIS ETAL 3,148,451

PEN SPEED ANTICIPATING CIRCUIT

Filed Dec. 29, 1961 18 Sheets-Sheet 3

Sept. 15, 1964 J. R. MORRIS ETAL 3,148,451

PEN SPEED ANTICIPATING CIRCUIT

Filed Dec. 29, 1961 18 Sheets-Sheet 6

FIG. 30.

| | | | | | | | | | | | | | | | | | | | | | | | | |
|---|---|---|---|---|---|---|---|---|---|---|---|---|---|---|---|---|---|---|---|---|---|---|---|---|
| CH 7 | LATERAL PARITY CHANNEL | | | | | | | | | | | | | | | | | | | | | | | |
| CH 6 | TK | SP | 3 | 0 | 5 | 10 | 14 | 9 | 4 | 14 | 9 | 4 | 14 | 9 | 4 | 14 | 9 | 4 | 14 | 9 | 4 | 14 | 9 | 4 |
| CH 5 | TN | B>A | 4 | 1 | 6 | 11 | 13 | 8 | 3 | 13 | 8 | 3 | 13 | 8 | 3 | 13 | 8 | 3 | 13 | 8 | 3 | 13 | 8 | 3 |
| CH 4 | CLOCK PULSE CHANNEL | | | | | | | | | | | | | | | | | | | | | | | |
| CH 3 | PH | 0 | 5 | 2 | 7 | 12 | 12 | 7 | 2 | 12 | 7 | 2 | 12 | 7 | 2 | 12 | 7 | 2 | 12 | 7 | 2 | 12 | 7 | 2 |
| CH 2 | HI | 1 | 6 | 3 | 8 | 13 | 11 | 6 | 1 | 11 | 6 | 1 | 11 | 6 | 1 | 11 | 6 | 1 | 11 | 6 | 1 | 11 | 6 | 1 |
| CH 1 | CE | 2 | 7 | 4 | 9 | 14 | 10 | 5 | SN | 10 | 5 | SN | 10 | 5 | SN | 10 | 5 | SN | 10 | 5 | EL | 10 | 5 | CA |
| | | DA | | LA | | | D | | | C | | | B | | | A | | | β | | | α | | |

DA - DRAWING ADDRESS
LA - LINE ADDRESS
CE - CENTERLINE
C.A - CIRCULAR ARC
SN - SIGN
TK - THICK PEN
TN - THIN PEN
PH - PHANTOM LINE
HI - HIDDEN LINE
EL - ELLIPSE
SP - SLOW PEN

NUMIERICAL DESIGNATION IN PROGRAM EQUALS X IN $2^{-X}$ AND EQUALS RATIO OF FULL SCALE VALUE.

CLOCK PULSE BITS ARE ALL ONES.

PARITY - EVEN, LONGITUDINAL - ODD - LATERAL.

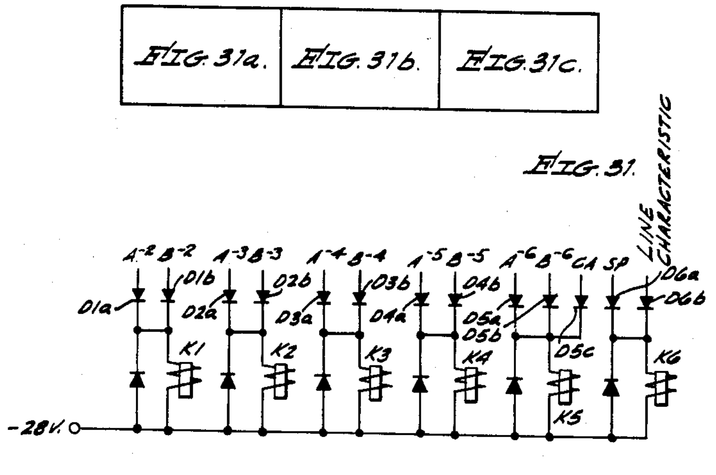

FIG. 31. FIG. 36.

Sept. 15, 1964 J. R. MORRIS ETAL 3,148,451

PEN SPEED ANTICIPATING CIRCUIT

Filed Dec. 29, 1961

18 Sheets-Sheet 17

United States Patent Office 3,148,451

Patented Sept. 15, 1964

3,148,451

PEN SPEED ANTICIPATING CIRCUIT

John R. Morris, Los Angeles, Calif., and Leo E. Rainville, Jr., Minneapolis, Minn., assignors to Hughes Aircraft Company, Culver City, Calif., a corporation of Delaware Filed Dec. 29, 1961, Ser. No. 163,295
6 Claims. (Cl. 33—18)

This invention relates generally to systems of electrical control, and more particularly to a circuit operable in a drafting machine for controlling the termination of the drawing of a line.

The descriptive disclosure which follows is directed particularly to a line termination control including an anticipation control. Details relating to other aspects of this system may be had by reference to a copending application of P. Brock et al., Serial No. 163,263, entitled Electrical System, filed on the same date as this application and assigned to the assignee of this invention.

While the descriptive disclosure hereinafter is particularly directed to a system for moving a pen or other line drawing implement according to a specified program for the purpose of making drawings, writing, printing and the like, it will be appreciated that this invention is not particularly limited to such a specific function or to such a particular type of output device but may be used to power any suitable device in the layout or manufacture of printed circuits in machining operations, etc.

Efforts have been made by others to automatize drafting, that is, to automatize the making of line drawings. These prior art systems have been developed to the point where the specific drawing is completely encoded on a digital record member as a digital program. These systems are usually based upon a system of mathematics defining straight lines in point-slope form. The digital program is transduced in a specific sequence and converted to analog form to power a suitable type of analog servo system having a pair of servo motors which power and move a single output member in each of two mutually perpendicular directions.

These prior art arrangements have proved satisfactory for drawing straight lines at differing slopes. They have, however, been particularly limited to the drawing of straight lines. In such systems curves have been simulated by drawing short, straight lines of progressively changing slopes in end-to-end relationship. In a system of this type, depending upon how accurately a curved line is to be simulated, the use of shorter and shorter straight line segments requires correspondingly larger numbers of definitions of line start and end points to achieve the desired approximated curve. This is a very time consuming operation from the viewpoint of preparing the program, as well as from the viewpoint of the time of operation of the machine in reading and reproducing these multitudes of short, straight line segments in simultating curves. One problem associated with a drafting machine is to properly terminate the drawing of a line with a pin that may move a different speed for various lengths of lines.

An object of this invention is to provide a circuit for anticipating the time of termination of a path of movement for a controlled object such as a pen moving at predetermined different speeds.

It is a further object of this invention to provide a system for controlling a drawing pen moving at different speeds to be raised from a surface at a selected time to overcome a fixed delay.

It is another object of this invention to provide, in a drafting machine having a time variable terminating voltage to move a pen at different speeds and a pen lift device having a fixed time delay, a circuit for developing an anticipate bias dependent on the pen speed to vary the time of lifting the pen so that line length is relatively independent of pen speed.

It is still another object of this invention to provide, in a drafting machine having a function generator with a selected frequency for controlling a pen to draw a line with the speed of pen movement varying with the selected frequency and having means for forming a terminating function, an anticipate circuit including an attenuation network set to a value to correspond to the selected frequency and controlling a pen lift network to lift the pen at a time varying with the speed of pen movement so that line length is relatively independent of pen speed.

The aforesaid and other objects and advantages are achieved in an arrangement according to this invention which generates and employs time variable electrical quantities characterized by selected time parametric functions for controlling a servo system to selectively describe straight lines, circular arcs, or circles, and elliptical arcs, or ellipses, of specific dimension or sizes and at particularly defined points in a given reference plane, such as a drawing board.

The program of the servo system is digitally encoded on a suitable record medium, such as paper tape, magnetic tape or other record bearing medium, as a discrete information code system in conventional binary code, for instance, together with other discrete information recordings having place of position significance on the medium for directing control of specific control elements in the system. Suitable transducers read this medium or tape and the signals thus generated after suitable conversion, amplification and shaping, if needed, are stored in a digital storage circuit such as a shift register which may include a plurality of flip flops conventionally set in correspondence with the respective discrete signals. The digitally encoded information includes the following:

(1) Dimensions in both coordinates from a reference point in the reference plane to the geometric center of the figure which is to be drawn.

(2) Dimensions and their signs defining the starting point of any line describing a geometric figure in terms of the respective coordinates of that point referred to the geometric center of the figure.

(3) Dimensions and their signs defining the stopping point of any line.

(4) Respective commands denoting if a circular arc or an ellipse is to be drawn.

(5) Respective commands denoting which of several line thicknesses is to be used.

(6) Respective commands denoting if any of several line interruption patterns (line characteristics) is to be used.

The system includes a variable frequency electrical function generator for generating sine and cosine electrical quantities of a fixed magnitude which are relatively positive or negative depending upon the algebraic signs of the coordinates defining the starting point of the line describing the geometric figure in relation to the geometric center of the figure and which vary in frequency as a function of a selected algebraic combination of at least a portion of the information defining these coordinates to provide time varying output voltages having a frequency roughly inversely proportional to the desired length of a line.

The time varying voltages thus generated are attenuated, or amplitude modulated, or multiplied by another voltage, or otherwise suitably modified, in selected pairs as a function of the coordinates of the starting point of the line defining the figure to provide simultaneous time varying X and Y line generating voltages, the corresponding instantaneous magnitudes of which jointly define respective points on the line describing the figure.

Respective position servos, termed the X and Y servos herein, are connected to and power a single output element such as a pin, for instance. The time varying voltages are applied to respective summing amplifiers the outputs of which are used to control the respective servos. These servos may include electrical motors or other suitable motor means forming part of a position servo loop of sufficient stiffness and commensurate damping to provide continuous regulation for zero voltage and, hence, position error, in following the respective time varying voltages. Such a servo arrangement may typically include a feedback potentiometer driven by a servo motor and energized by a constant or fixed voltage. The voltage tapped from this potentiometer is conventionally subtractively combined with the input voltage to the servo providing an arrangement tending to regulate for zero position error. Such a potentiometer has a length in an electrical sense at least equal to the actual maximum length of the line which may be drawn.

In operation provision is made for slewing the pen to the starting point of the line describing a selected figure. At this time the function generator is "caged" and does not produce time varying voltages. It does, however, produce positive and negative values of a fixed reference voltage which are suitably attenuated and used in the pen slewing operation. During slewing the servos are uncontrolled as to relative speeds and the pen is in elevated position. With the occurrence of a minimum threshold error in the larger of the two error quantities at the servo motor inputs, and after a time delay sufficient to allow the servo motors to settle, a signal is generated which starts the function generator and which drops the pen. The pen is now precisely positioned in line drawing position at the starting point of the line and now produces a line describing the figure which is desired, the servos now being controlled by the time varying line generating voltages. The function generator "free runs" and must be told when to stop.

Since the servos follow the respective time varying voltages, separate provision must be made to stop a line defining a geometric figure at a particular point. This is accomplished by using the function generator outputs to generate a separate time varying line-terminating voltage of sinusoidal character, for instance, which goes through zero from a positive value to a negative value, or vice versa, depending upon system requirements, in all instances, at the precise point in time on the respective time varying line generating voltages at which the line is to be interrupted. At line termination provision is made to switch the summing amplifiers for the respective servos to their memory modes so that the instantaneous magnitudes of the respective time varying line generating voltages at line termination are maintained. The servos thus have a memory of the position of the point of termination of the line. The line terminating voltage is also compensated by a voltage which varies approximately with line length to introduce a variable anticipation of line termination in proportion to pen speed to compensate the fixed electrical and mechanical delays in lifting the pen.

At this point a signal is produced indicating that the figure has been completely drawn. This signal is utilized to reset the digital storage circuits and the function generator and to initiate reading and storing an additional section of the digitally encoded input information for the purpose of drawing the next figure forming another section of the drawing.

Other objects and advantages will become apparent from a study of the following specification when considered in conjunction with the accompanying drawings in which.

Figure 13:
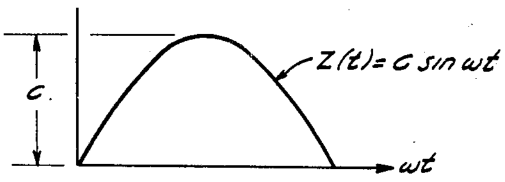

FIG. 13 graphically depicts a time varying quantity utilized as the line terminating function in the system herein and which as depicted is applicable in the termination of lines of the character indicated in FIGS. 1, 4, 7 and 10, respectively.

Figure 14:
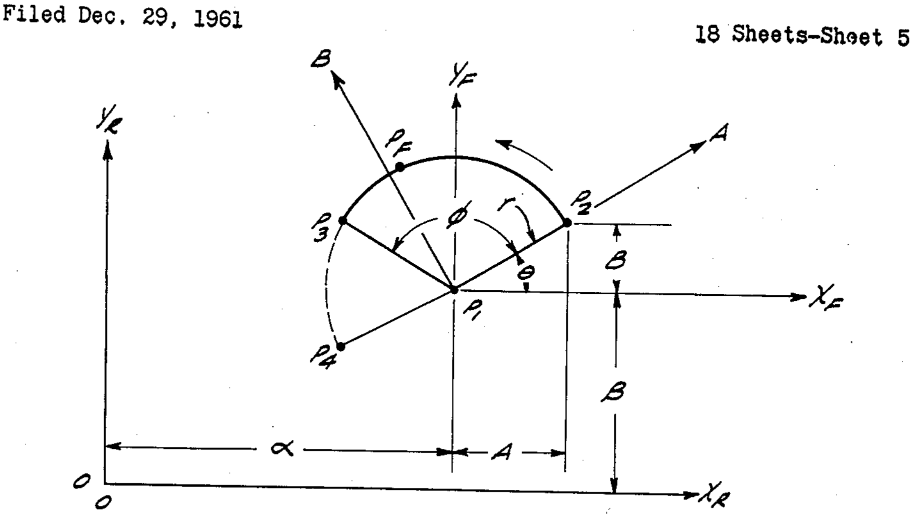
Figure 15:
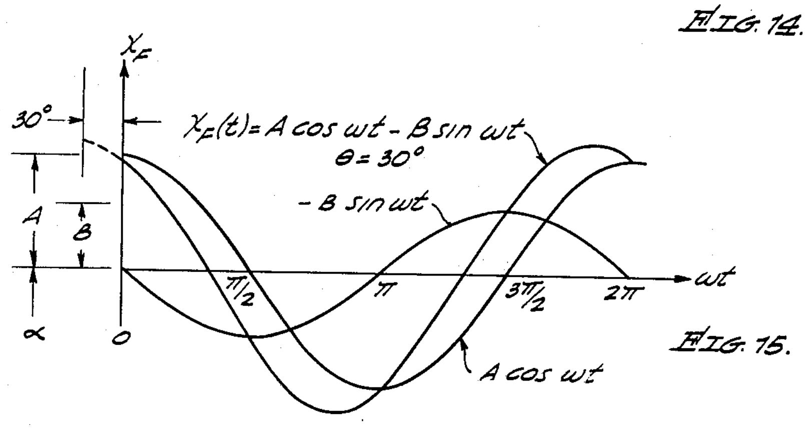
Figure 16:
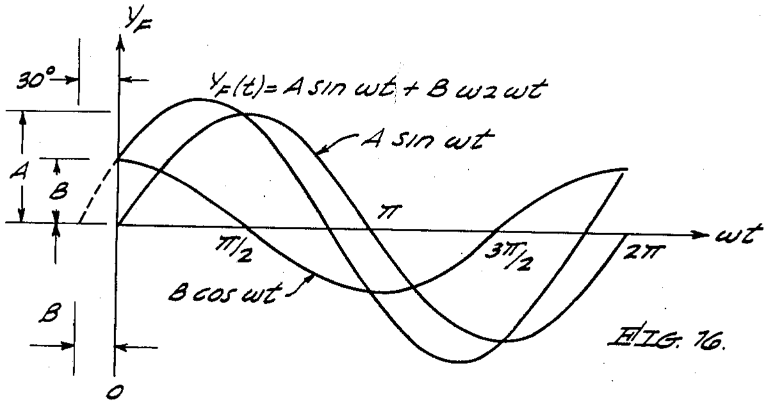
Figure 17:
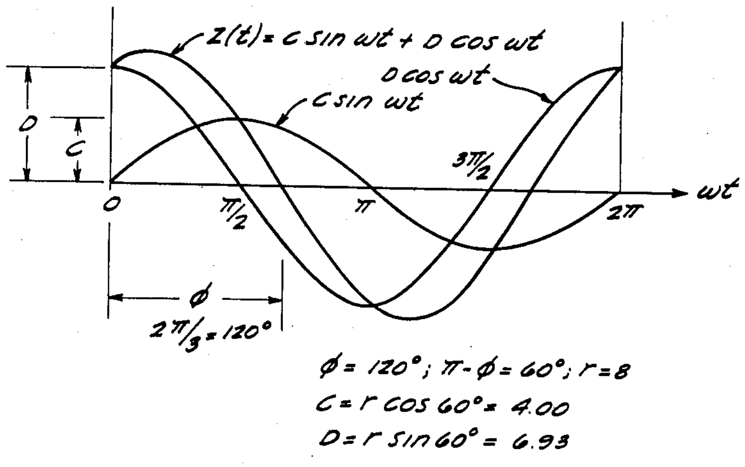
Figure 18:
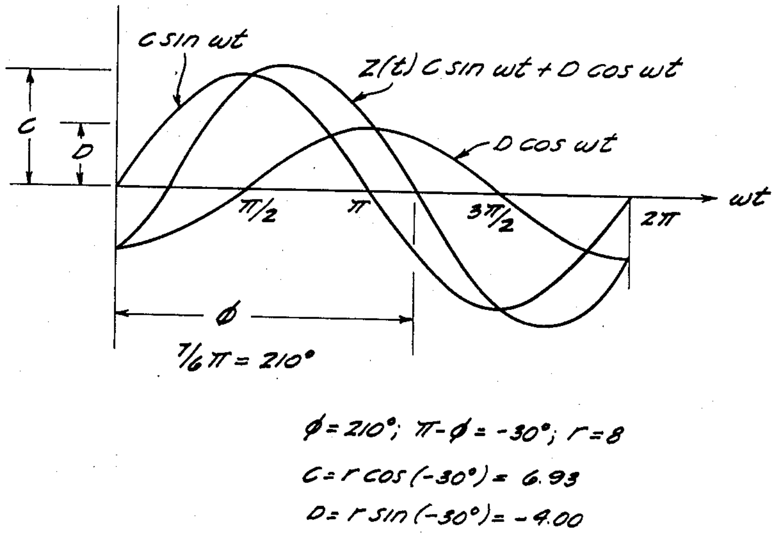
Figure 19:
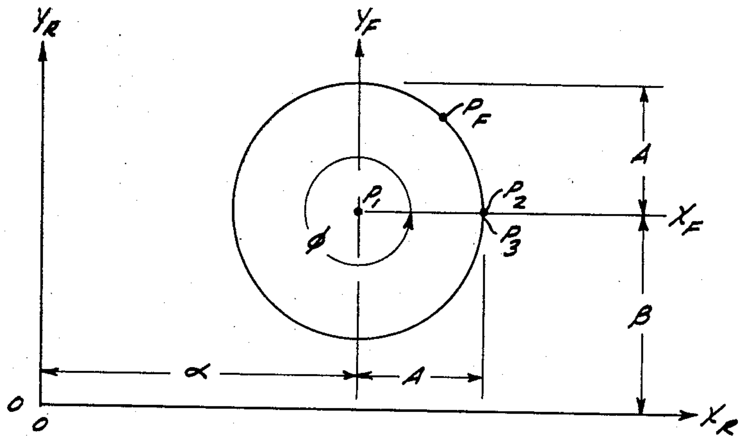
Figures 20, 21:
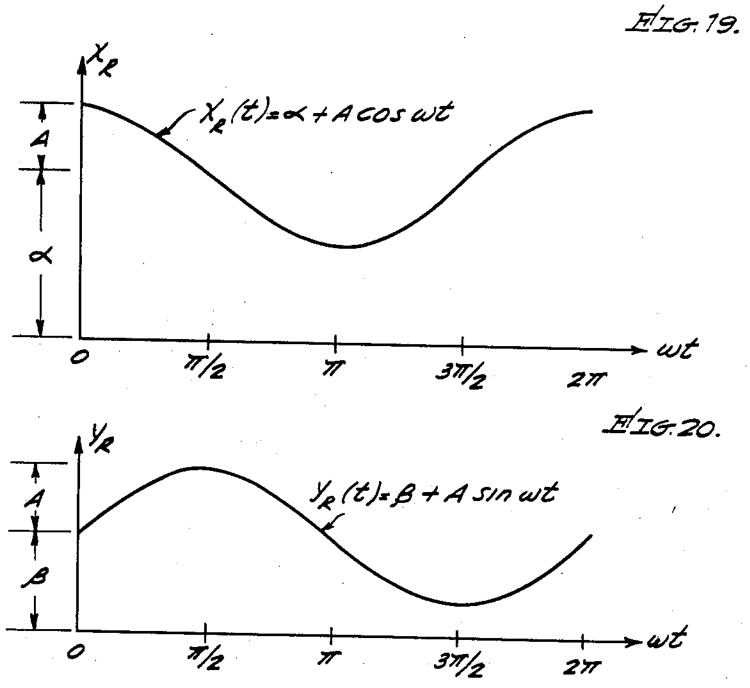
Figure 22:
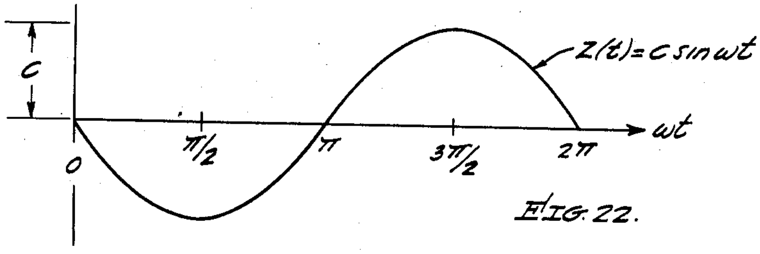
Figure 23:
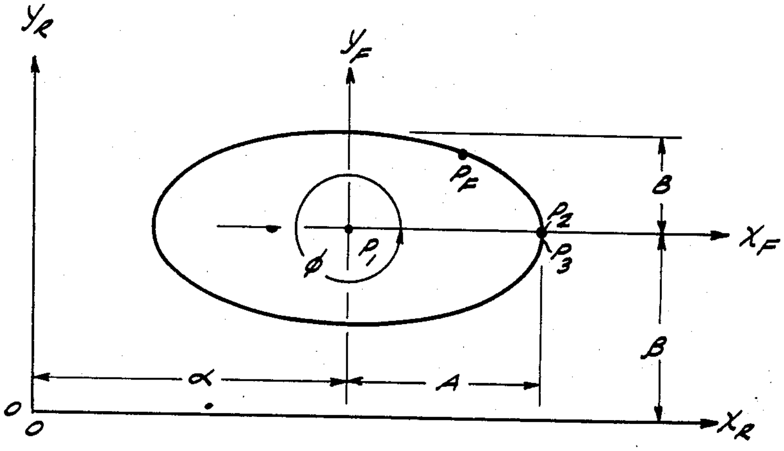
Figure 24:
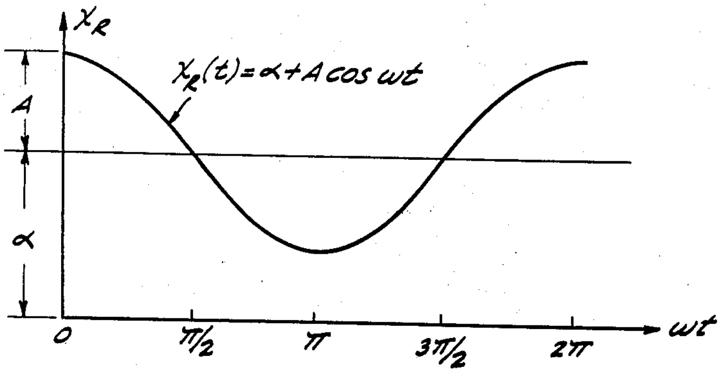
Figure 25:
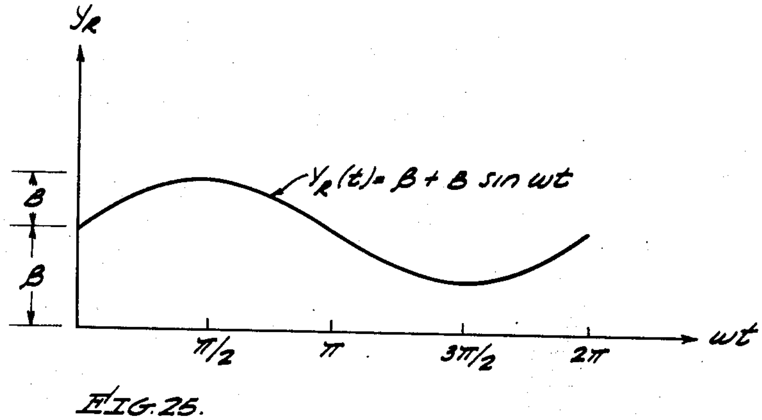
Figure 26:
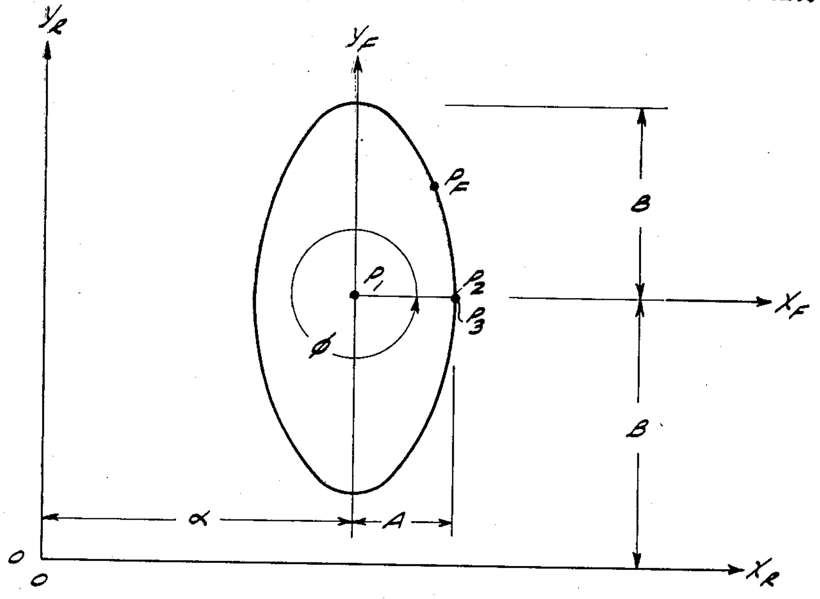
Figure 27:
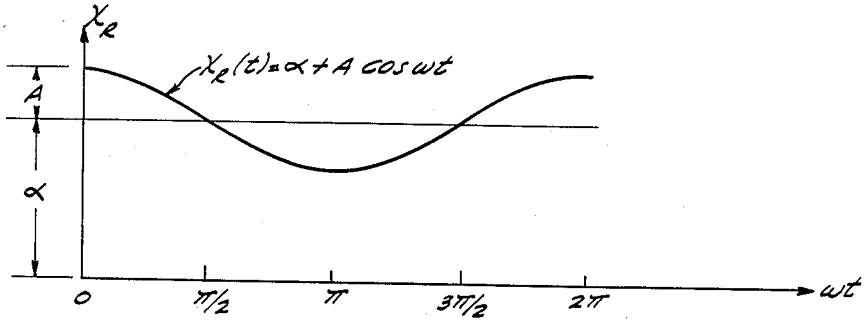
Figure 28:
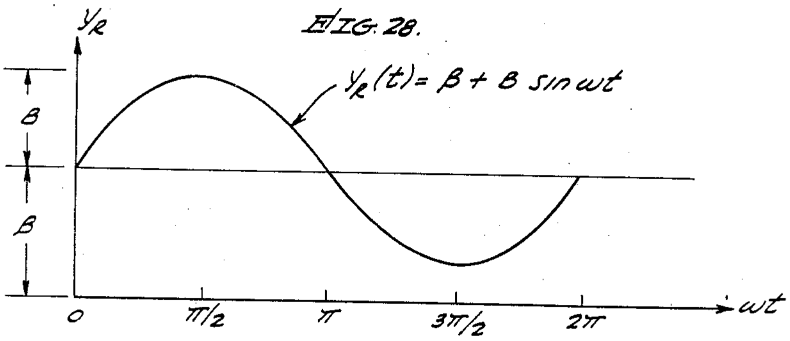

FIG. 14 is a graph of a circular arc having a starting point in the first quadrant of the coordinate system therefor;

FIGS. 15 and 16 are graphs of time varying quantities which depict the instantaneous magnitudes of the coordinates of points on the arc of FIG. 14;

FIG. 17 graphically depicts the time varying line terminating quantity for a circular arc of approximately the number of degrees of the arc of FIG. 14, having a stopping point in the second quadrant of the coordinate system therefor;

FIG. 18 graphically depicts the time varying line terminating quantity for an arc as seen in FIG. 14, having a stopping point in the third quadrant of the coordinate system therefor;

FIG. 19 is a graph of a circle having a starting point on the positive horizontal axis of a coordinate system intersecting at the center of the circle;

FIGS. 20 and 21 graphically depict the time varying line generating quantities defining the coordinates of points on the circle of FIG. 19;

FIG. 22 graphically depicts the time varying line terminating quantity for the circle;

FIG. 23 is a graph of an ellipse having its major axis on the horizontal axis and its minor axis on the vertical axis of a coordinate system intersecting at the geometric center of the ellipse;

FIGS. 24 and 25 graphically depicit time varying line generating quantities indicating the instantaneous magnitudes of the coordinates of points on the ellipse of FIG. 23;

FIG. 26 is a graph of an ellipse having its minor axis on the horizontal axis and its major axis on the vertical axis of a coordinate system intersecting in the geometric center of the ellipse;

FIGS. 27 and 28 are time varying line generating quantities depicting the magnitudes of the coordinates of points on the ellipse of FIG. 26.

Figure 29:
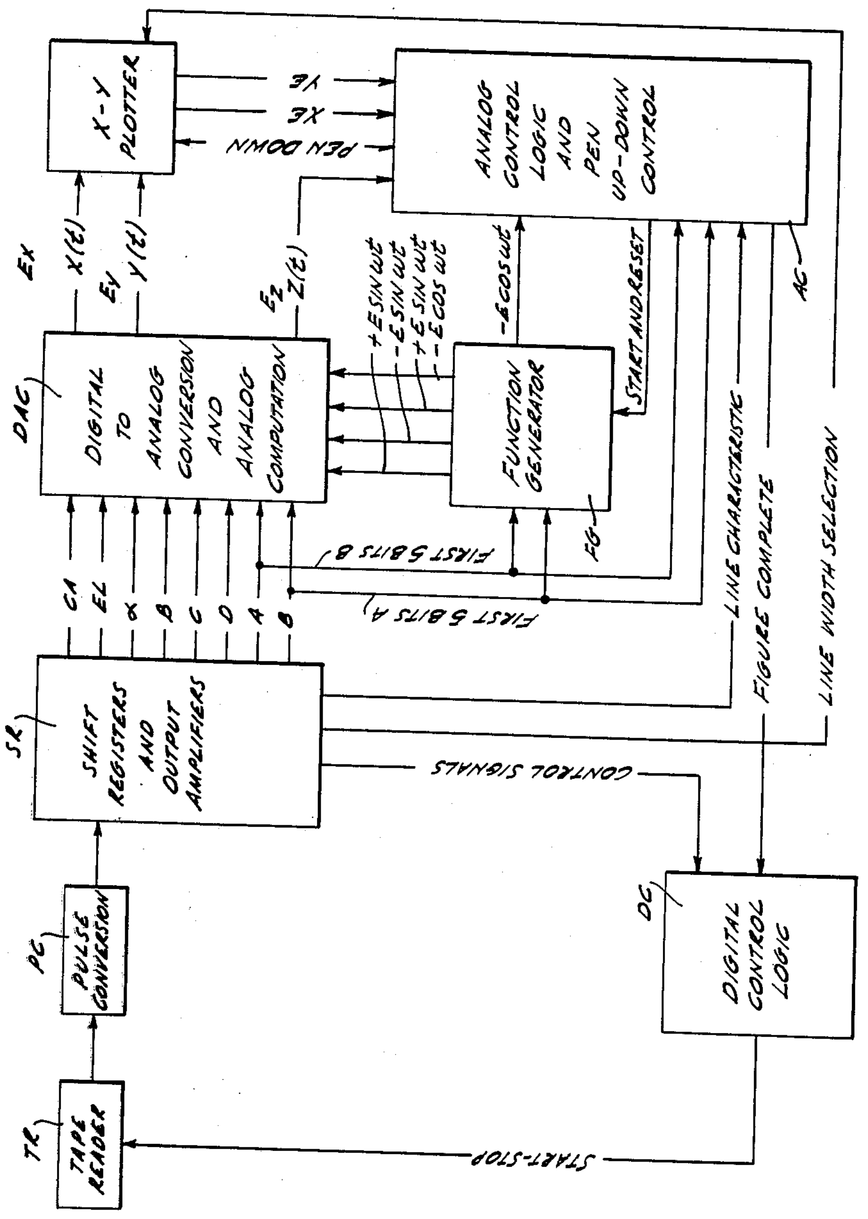

FIG. 29 is a block diagram of an improved electrical system of control for controlling the movement and/or position of an element and which embodies the principles of this invention.

Figure 31A:
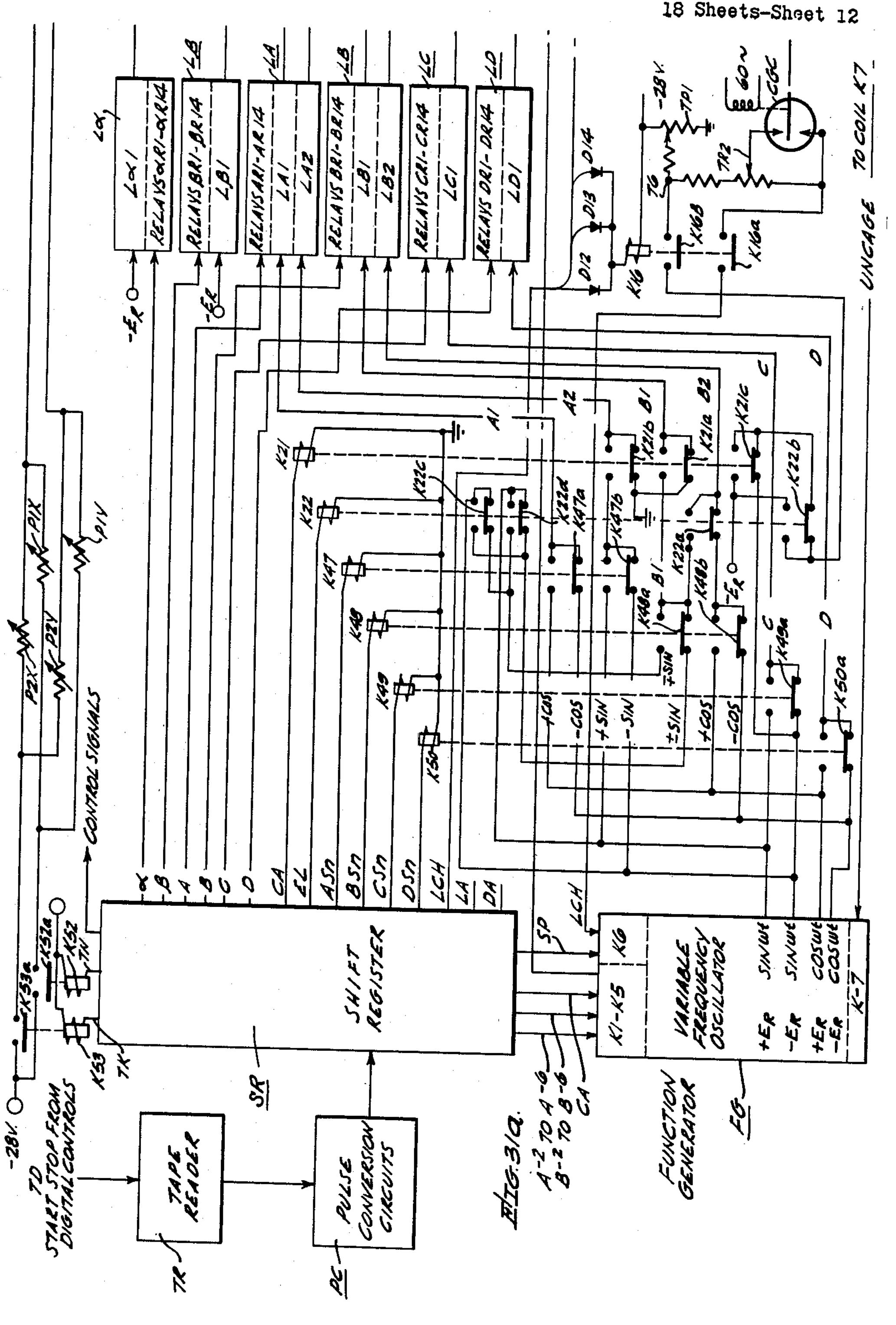
Figure 31B:
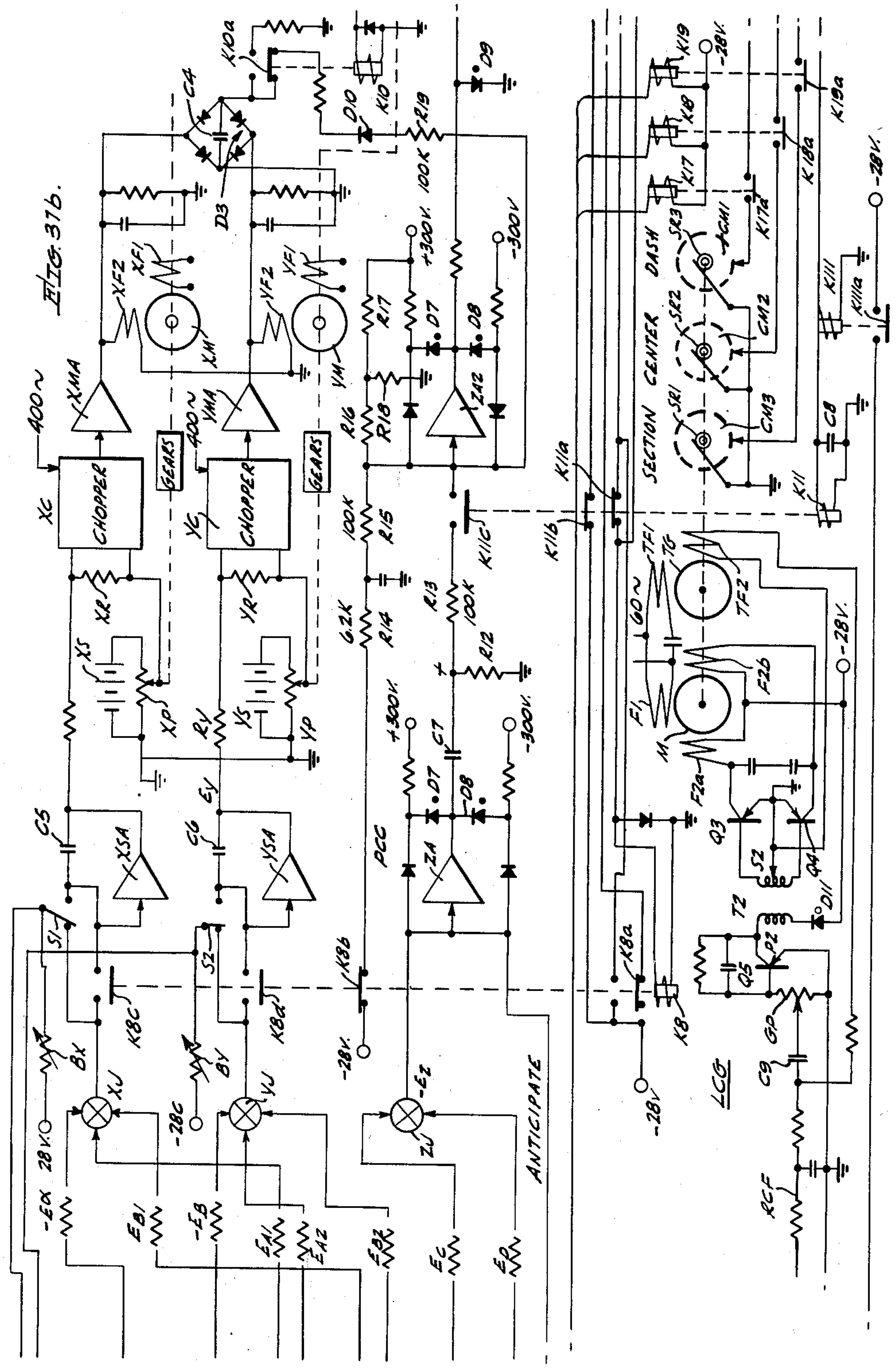

FIG. 30 illustrates a typical tape format employable in programming the present system;

FIG. 31 illustrates the arrangements of the sheets of drawings containing FIGS. 31*a*, 31*b* and 31*c* to form a complete circuit;

FIGS. 31*a*, 31*b* and 31*c* viewed together illustrate the electrical system of FIG. 29 in greater detail.

Figures 37, 37C, 38:
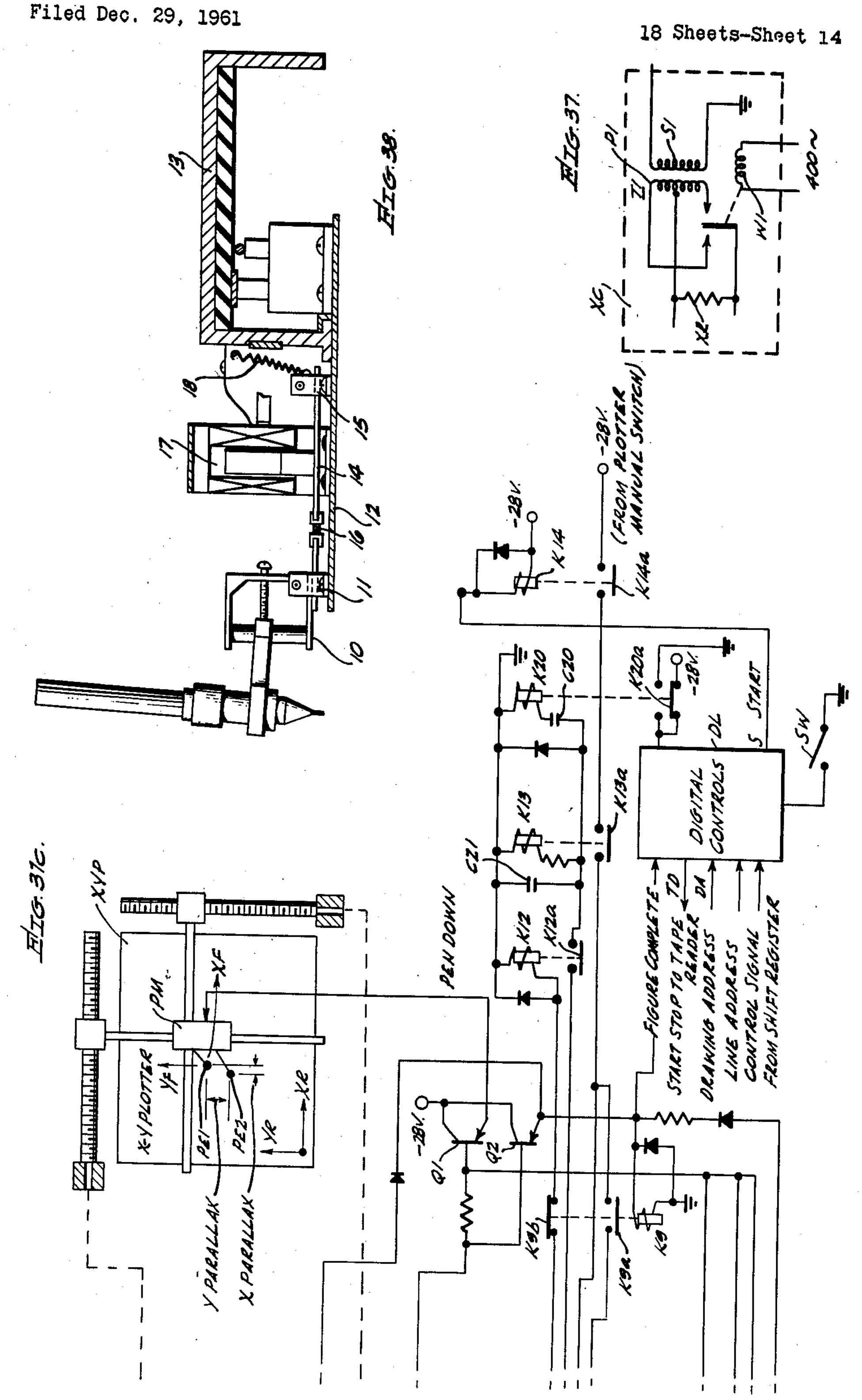
Figure 32:
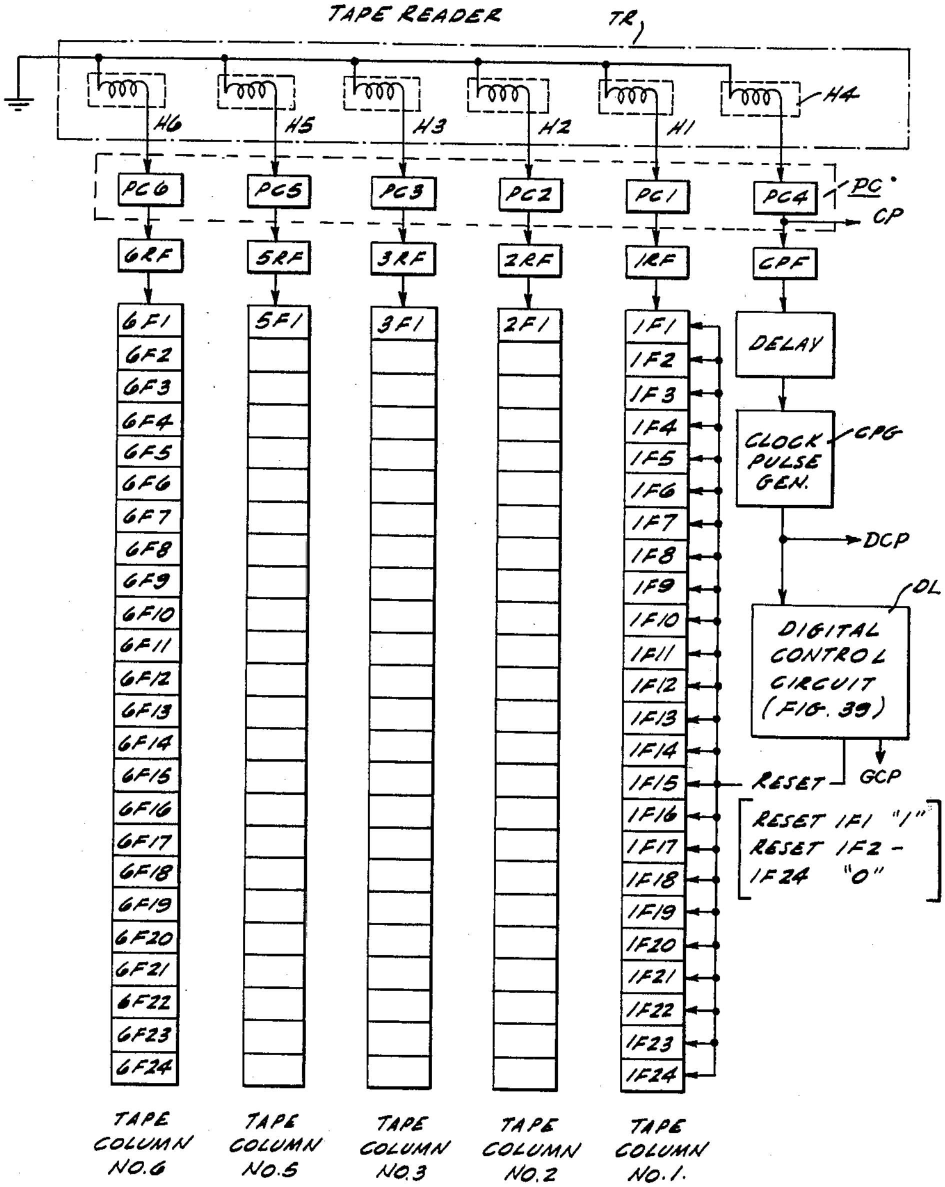
Figure 33:
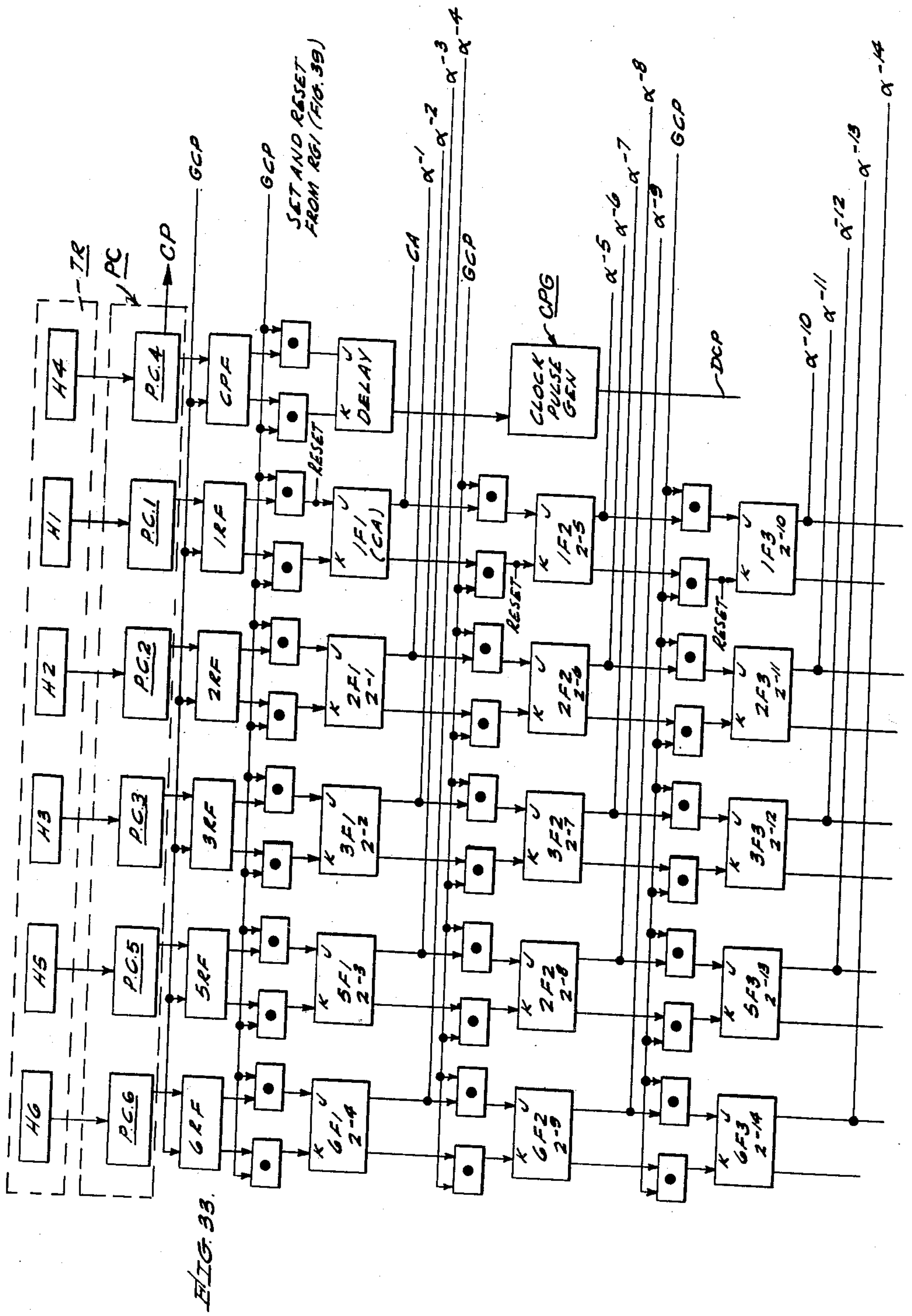
Figure 34:
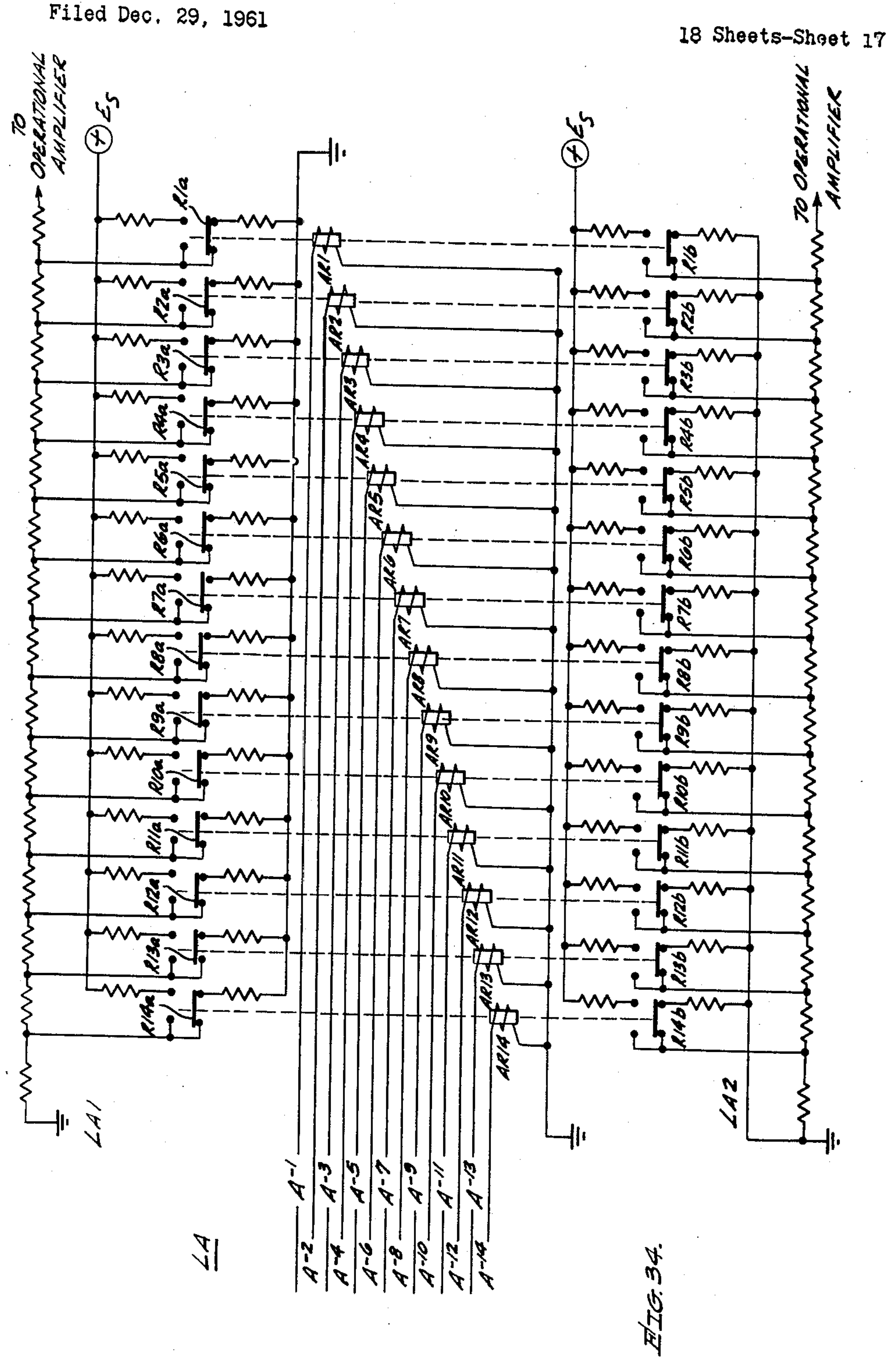
Figure 35:
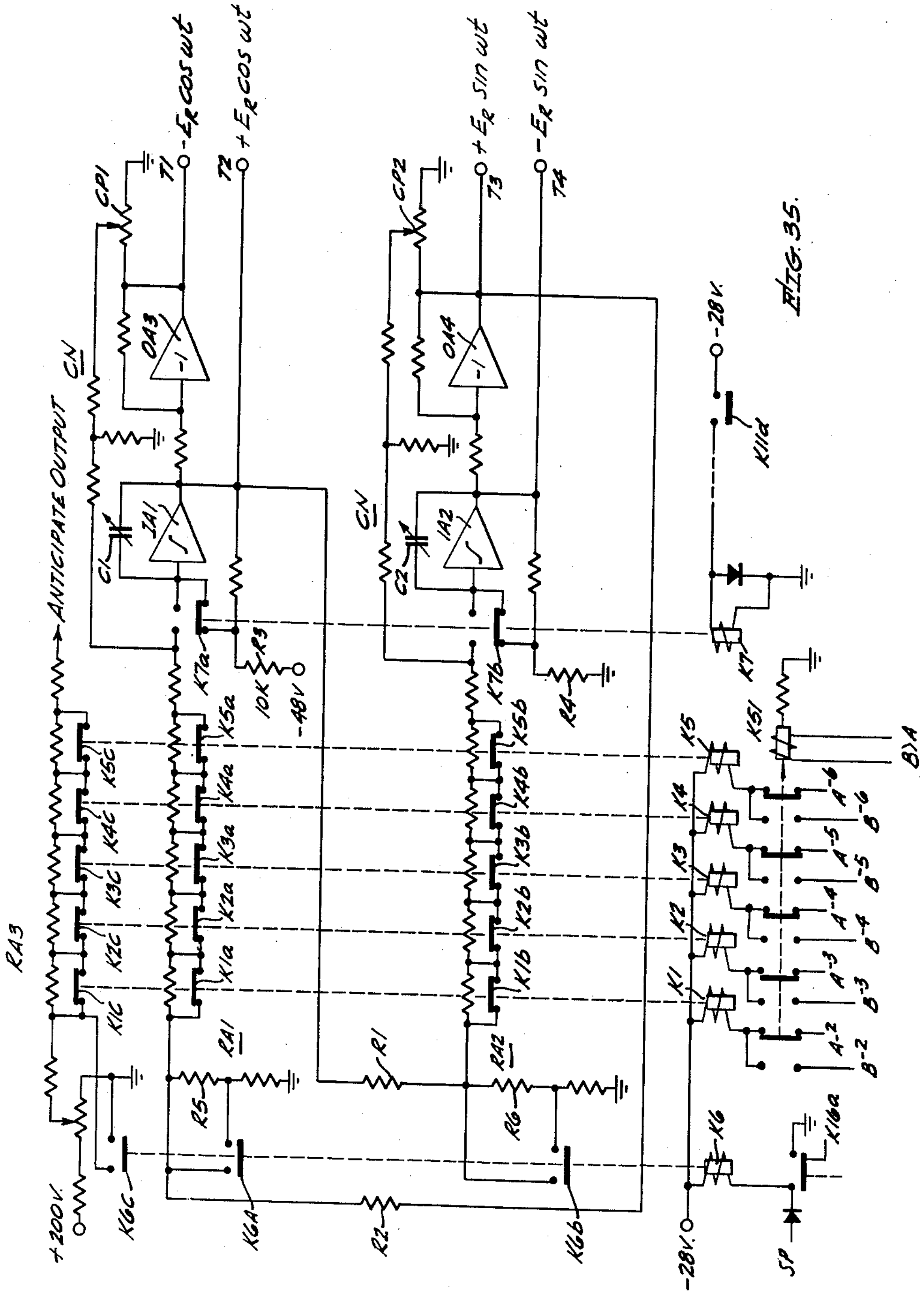

FIG. 32 schematically illustrates the organizational relationship of the tape reader and shift register of this invention;

FIG. 33 illustrates certain features of a portion of the shift register of FIG. 32 in greater detail;

FIG. 34 diagrammatically illustrates a type of analog to digital converter employed in this invention;

FIG. 35 diagrammatically illustrates a function generator of the type employed in this invention;

FIG. 36 illustrates a modification of the relay control circuit of FIG. 34;

FIG. 37 diagrammatically illustrates a chopper of the type employed in this invention;

FIG. 38 schematically illustrates certain features of an arrangement for movably mounting a pen of the type employed in the X–Y plotter herein to permit movement between retracted and drawing position.

The design of a system for producing movement of an output member in any direction in a single plane is dependent upon the type of drive which is employed to move the output member. The output member herein is movably supported by a mechanism having respective X and Y input members movable along paths which are mutually perpendicular. These input members are powered by respective motors. This arrangement is commonly known as an X–Y plotter and the motors are referred to herein as the X motor and the Y motor, respectively.

If the X input member is moved and the Y input member remains stationary the movement of the output member parallels the movement of the X input member. Movement of the output member in a direction paralleling movement of the Y input member occurs when the X input member remains stationary while the W input member moves. Simultaneous movement of the X and Y members at speeds such that the ratio of Y displacement to X displacement at any instant is a constant defines a straight line having a slope $Y/X$. If $Y=f(X)$ is non-linear then a curve is generated. The nature of the curve depends upon the specific functional relationship.

The present system is directed to providing movement of the output member in such a way as to selectively generate straight lines of any slope, circular arcs, circles and elliptical arcs or ellipses and requires facilities for generating suitable electrical quantities for energizing the X and Y motors on the plotter to selectively generate the geometric figures described at any selected point on the plotter surface or reference plane defined thereby.

The mathematics of the system is based upon a geometry in which the geometric center of the figure to be drawn is the point of reference in defining the figure. The location of a figure in the reference plane is defined as the coordinate distances in $X_R$ and in $Y_R$ from the lower left corner of the reference plane to the geometric center of the figure. This defined center is the zero reference for a second system of rectangular coordinates $X_F$, $Y_F$ for the figure per se from which the coordinates of half-lengths of lines, the coordinates of radii and the coordinates of half-lengths of axes of ellipses are measured.

A general system of simultaneous, time parametric, line generating equations defines the geometric configuration of several figures as a locus of points having coordinates in $X_F$ and $Y_F$ and identifies the precise point at which a line describing a figure is to be started with respect to the zero point, i.e., the intersection of the axes $X_F$ and $Y_F$ for that figure.

Another time parametric equation defines the precise point in the coordinate system for a figure at which the line describing the figure is to be terminated.

The general system of time parametric line generating equations and the line terminating equation have a common parameter, $\omega t$, and are set forth below followed by several special forms of the equations resulting from special and specific cases.

The terms "positive slope" and "negative slope" are used herein in describing inclined straight lines. When the ratio of $Y_F$ to $X_F$ is positive, the slope is assumed to be positive, and when the ratio of $Y_F$ to $X_F$ is negative, the slope is assumed to be negative regardless of the direction of drawing of the line.

GENERAL EQUATIONS

*Line Generating Equations (General Form)*

$$X_R(t)=\alpha+A\cos\omega t-B\sin\omega t \quad (1)$$
$$Y_R(t)=\beta+A\sin\omega t+B\cos\omega t \quad (2)$$

Where: $\alpha$ and $\beta$ are respectively distances in $X_R$ and $Y_R$ from the lower left corner of the reference plane (drawing board) to the geometric center of the figure and define the intersection of the translated axes $X_F$, $Y_F$ which are the axes of the geometric figure to be drawn. The axes A and B are the translated and rotated axes having an intersection common with the axes $X_F$ and $Y_F$.

$$A=r\cos\theta=P_2\,(X_F) \quad (3)$$
$$B=r\sin\theta=P_2\,(Y_F) \quad (4)$$

Where: $r$ is the half-length of a straight line, the radius of a circular arc or the half-length of an axis of an ellipse and $\theta$ is the angle measured counterclockwise from positive A ($X_F$) (conventionally on the right of $Y_F$) to the radical line intercepting the transformed $\alpha$ and $\beta$ origin and a point, say $P_2$, at which a circular arc, a circle, an ellipse or straight line is started. Graphically, $\theta$ determines the counterclockwise angle $\omega t$ through which the axes A and B are rotated so that A intercepts $P_2$, whence Equations 1 and 2 above also relate the original and rotated coordinates of $P_2$ or, more generally, any point $P_F$ on a line through $P_2$. Alternatively, $\omega t$ may be regarded as the clockwise angle through which the axes $X_F$, $Y_F$ are rotated. In each instance $\theta=\omega t$.

Sin $\omega t$ and cos $\omega t$ are variable frequency transcendental functions which are selectively positive or negative in the system, depending upon the alegbraic signs of A and B in the respective expressions $A\cos\omega t$, $B\sin\omega t$, etc., which always start at 0° (positive values of A or B) or 180° (negative values of A or B), independently of $\theta$, which are generated in the system when the conditions $\alpha\pm A$ and $\beta\pm B$ are satisfied and which may be terminated at any point in one full cycle depending upon $Z(t)$, Equation 5, which follows.

*Line Terminating Equations (General Forms)*

$$Z(t)=C\sin\omega t+D\cos\omega t \quad (5)$$

Where:

$$C=r\cos(\pi-\phi)=X_F \quad (6)$$
$$D=r\sin(\pi-\phi)=Y_F \quad (7)$$

Where: $r$ is defined in connection with Equations 3 and 4, and $\phi=\omega t=$the number of degrees in an arc of a circle, a circle or an ellipse. (A straight line is here treated as a special case—see definition of $r$, Equations 3 and 4.)

*Special Cases:*

(1) Semicircle; $\phi=180°$
(2) Straight line; $\phi=180°$
(3) Circle; $\phi=360°$
(4) Ellipse; $\phi=360°$

SPECIFIC EQUATIONS

*Derivations From Equations 1 and 2*

Straight lines:

For any point along a straight line $\cos\omega t=K$ (see definition of $\sin\omega t\cos\omega t$, Equations 1 and 2 supra) where K is any distance along the line from the origin which is the center of the line and $\sin\omega t=0$.

From Equations 1 and 2 for a straight line $$X(t)=\alpha+A\cos\omega t \quad (8)$$
$$Y(t)=\beta+B\cos\omega t \quad (9)$$

where each of A or B may be positive or negative.

(1) Positive slope:

(*a*) Case I: Start first quadrant of coordinate system $X_F$, $Y_F$ (see FIG. 1)

$$X_R(t)=\alpha+A \cos \omega t \quad (10)$$
$$Y_R(t)=\beta+B \cos \omega t \quad (11)$$

(*b*) Case II: Start third quadrant of coordinate system $X_F$, $Y_F$ (see FIG. 4)

$$X(t)=\alpha-A \cos \omega t \quad (12)$$
$$Y(t)=\beta-B \cos \omega t \quad (13)$$

(2) Negative slope:

(*a*) Case III: Start second quadrant of coordinate system $X_F$, $Y_F$ (see FIG. 7)

$$X(t)=\alpha-A \cos \omega t \quad (14)$$
$$Y(t)=\beta+B \cos \omega t \quad (15)$$

(*b*) Case IV: Start fourth quadrant of coordinate system $X_F$, $Y_F$ (see FIG. 10)

$$X(t)=\alpha+A \cos \omega t \quad (16)$$
$$Y(t)=\beta-B \cos \omega t \quad (17)$$

Circular arcs and circles:

(1) Start on axes $X_F$ or $Y_F$ (*a*) Start positive horizontal axis ($\theta=0°$)

$$X(t)=\alpha+A \cos \omega t \quad (18)$$
$$Y(t)=\beta+A \sin \omega t \quad (19)$$

(*b*) Start positive vertical axis ($\theta=90°$)

$$X(t)=\alpha-B \sin \omega t \quad (20)$$
$$Y(t)=\beta+B \cos \omega t \quad (21)$$

(*c*) Start on negative horizontal axis ($\theta=180°$)

$$X(t)=\alpha-A \cos \omega t \quad (22)$$
$$Y(t)=\beta-A \sin \omega t \quad (23)$$

(*d*) Start on negative vertical axis ($\theta=270°$)

$$X(t)=\alpha+B \sin \omega t \quad (24)$$
$$Y(t)=\beta-B \cos \omega t \quad (25)$$

(2) Start in quadrants of $X_F$, $Y_F$ (*a*) First quadrant ($0°<\theta<90°$)

$$X(t)=\alpha+A \cos \omega t-B \sin \omega t \quad (26)$$
$$Y(t)=\beta+A \sin \omega t+B \cos \omega t \quad (27)$$

(*b*) Second quadrant ($90°<\theta<180°$)

$$X(t)=\alpha-A \cos \omega t-B \sin \omega t \quad (28)$$
$$Y(t)=\beta-A \sin \omega t+B \cos \omega t \quad (29)$$

(*c*) Third quadrant ($180°<\theta<270°$)

$$X(t)=\alpha-A \cos \omega t+B \sin \omega t \quad (30)$$
$$Y(t)=\beta-A \sin \omega t-B \cos \omega t \quad (31)$$

(*d*) Fourth quadrant ($270°<\theta<360°$)

$$X(t)=\alpha+A \cos \omega t+B \sin \omega t \quad (32)$$
$$Y(t)=\beta+A \sin \omega t-B \cos \omega t \quad (33)$$

For an ellipse the dimensions of the major and minor axes are different, whence the sine and cosine functions swing between different extremes. By choice herein the ellipse, or an elliptical arc, is started on the X axis and is therefore defined by a system of equations such as (18) and (19) having differing coefficients for the functions of the angles. Since the starting point of an arc of an ellipse or of an ellipse is limited to positive or negative $X_F$, the selection of positive or negative values of B when A is positive or negative may be used to control the direction of rotation in generating the ellipse.

Ellipse:

(1) Start on positive horizontal axis ($X_F$) ($\theta=0°$). Counter clockwise generation:

$$X(t)=\alpha+A \cos \omega t \quad (34)$$
$$Y(t)=\beta+B \sin \omega t \quad (35)$$

(2) Start on positive horizontal axis ($X_F$) ($\theta=0°$). Clockwise generation:

$$X(t)=\alpha+A \cos \omega t \quad (36)$$
$$Y(t)=\beta-B \sin \omega t \quad (37)$$

(3) Start on negative horizontal axis ($X_F$) ($\theta=180°$). Clockwise generation:

$$X(t)=\alpha-A \cos \omega t \quad (38)$$
$$Y(t)=\beta+B \sin \omega t \quad (39)$$

(4) Start on negative horizontal axis ($X_F$) ($\theta=180°$). Counterclockwise generation:

$$X(t)=\alpha-A \cos \omega t \quad (40)$$
$$Y(t)=\beta-B \sin \omega t \quad (41)$$

The pairs of Equations 10 and 11, 12 and 13, 14 and 15, 16 and 17, describe the four conditions herein for straight lines depicted in FIGS. 1, 4, 7 and 10. In these figures $\alpha$ and $\beta$ denote the distances in $X_R$ and $Y_R$, respectively, to the center, $P_1$, of the line having the length L. The dimensions A and B denote the distances in $X_F$ and $Y_F$, respectively, to the starting point, $P_2$, of the line. $P_3$ denotes the end of the line. Since $P_1$ is the center of the line, the ratio of B to A defines the slope of the line and is the tangent of $\theta$. To draw line L all points $P_F$ must have coordinates $X_F$, $Y_F$ which are simultaneously in the same ratio as A and B and of diminishing magnitude from $P_2$ to $P_3$.

Figure 2:
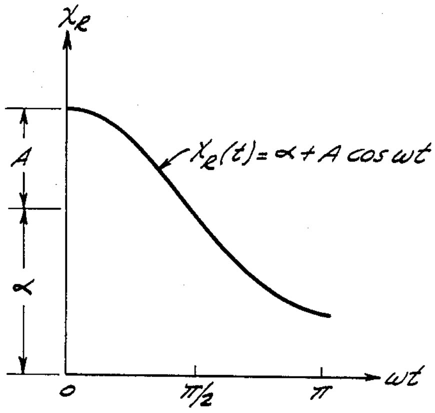
FIGS. 2 and 3 are graphs of time varying quantities depicting the instantaneous magnitudes of the coordinates of the line of FIG. 1.
Figure 3:
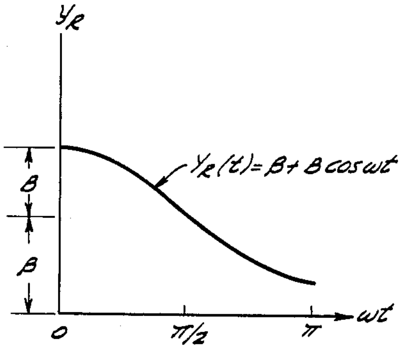
Figure 4:
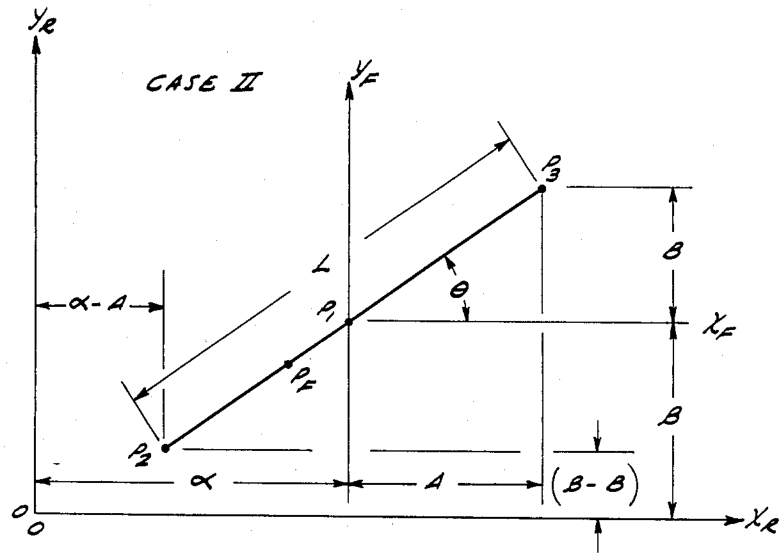
FIG. 4 is a graph of a straight line having positive slope in which the starting point $P_2$ for drawing the line is in the third quadrant of the coordinate system therefor.

The cosine functions depicted in FIGS. 2 and 3 swing between positive and negative extremes of A and B, respectively, and consequently diminish the magnitudes $X_R$ and $Y_R$, respectively, in proper time-phase relationship to maintain the relationship $B/A=k$ for all points $P_F$ on the line L between $P_2$ (the starting point) and $P_3$ (the line termination point). In this case note that A and B are positive, i.e., added to $\alpha$ and $\beta$, respectively; hence, to draw a line of positive slope from $P_2$ to $P_3$, initially positive cosine values are selected. Equations 10 and 11 define this line.

Figure 1:
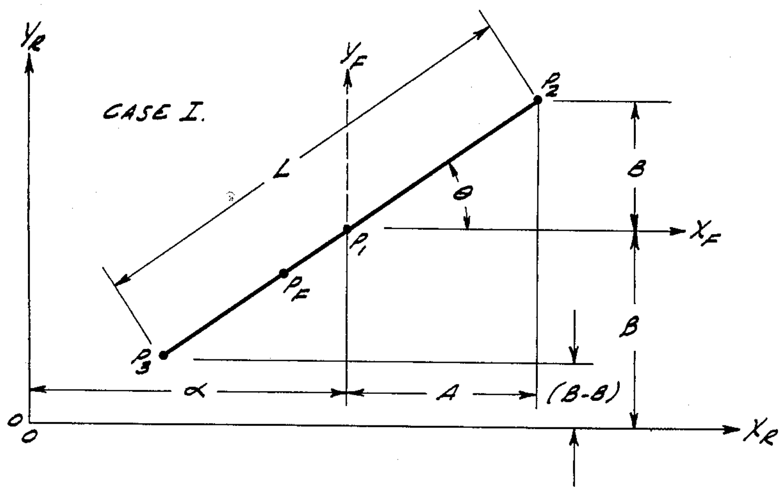
FIG. 1 is a graph of a straight line having a positive slope in which the starting point $P_2$ for drawing the line is in the first quadrant of the coordinate system therefor.
Figure 5:
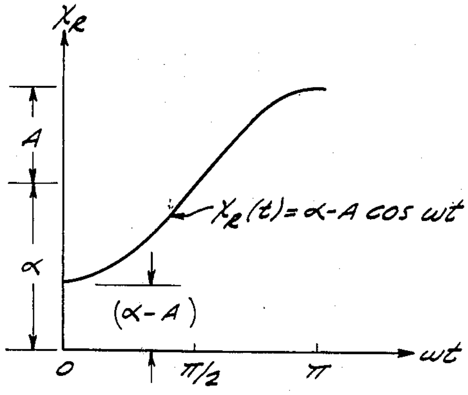
FIGS. 5 and 6 are graphs of time varying quantities depicting the instantaneous magnitudes of the coordinates of the line of FIG. 4.
Figure 6:
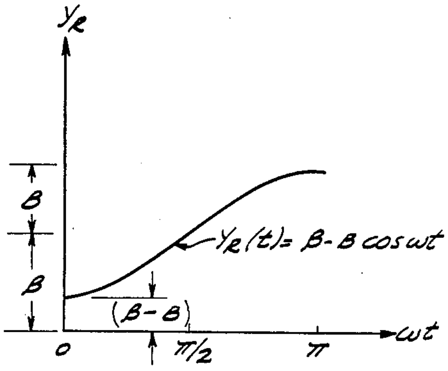
Figure 7:
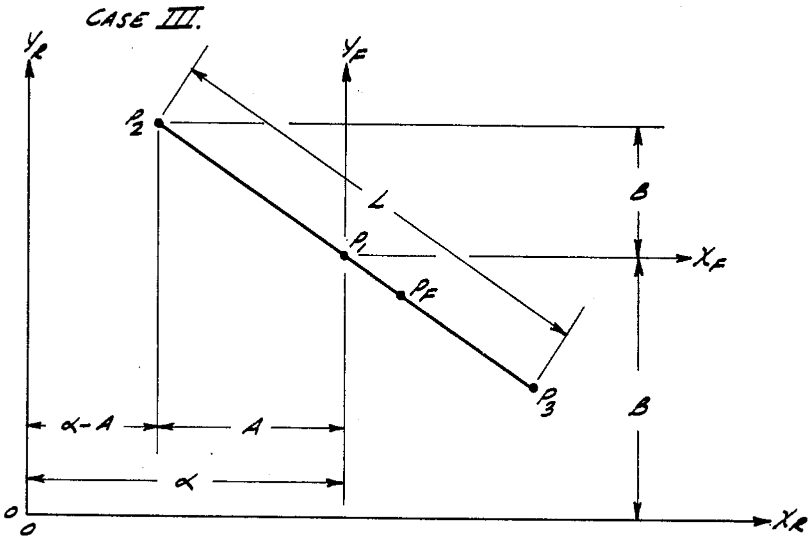
FIG. 7 is a graph of a straight line having negative slope in which the starting point $P_2$ for drawing the line is in the second quadrant of the coordinate system therefor.

In Case II (FIG. 4) $P_2$ is in the third quadrant of $X_F$, $Y_F$ and $P_3$ is in the first quadrant and the line slope is again positive, defining a condition the reverse of that of Case I (FIG. 1). $P_2$ in the coordinate system $X_R$, $Y_R$ is now defined $(\alpha-A)$ and $(\beta-B)$, respectively. FIGS. 5 and 6 depict the function $X_R(t)$, $Y_R(t)$ for this condition in which the coordinates of all points $P_F$ are increasing cosine functions of both A and B, swinging between −A, +A and −B, +B, respectively (Equations 12 and 13).

Figure 8:
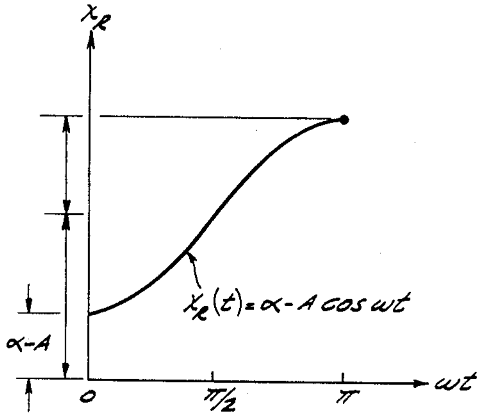
FIGS. 8 and 9 are graphs of time varying quantities depicting the instantaneous magnitudes of the coordinates of the line of FIG. 7.
Figure 9:
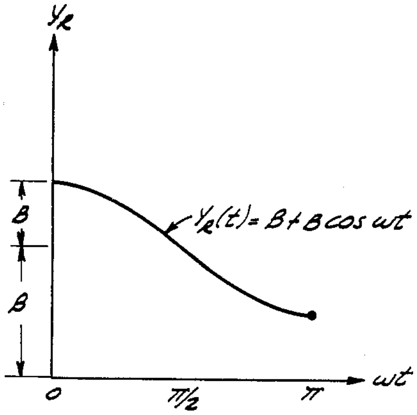

Cases III and IV (FIGS. 7 and 10) cover the two conditions for drawing a line of negative slope. In each case $X_F(t)$ and $Y_F(t)$ are oppositely changing cosine functions, i.e., in Case III $X_F(t)$ is a cosine function swinging between −A and +A, while $Y_F(t)$ also a cosine function, swings between +B and −B. FIGS. 8 and 9 graphically depict Equations 14 and 15 defining this condition.

Figure 10:
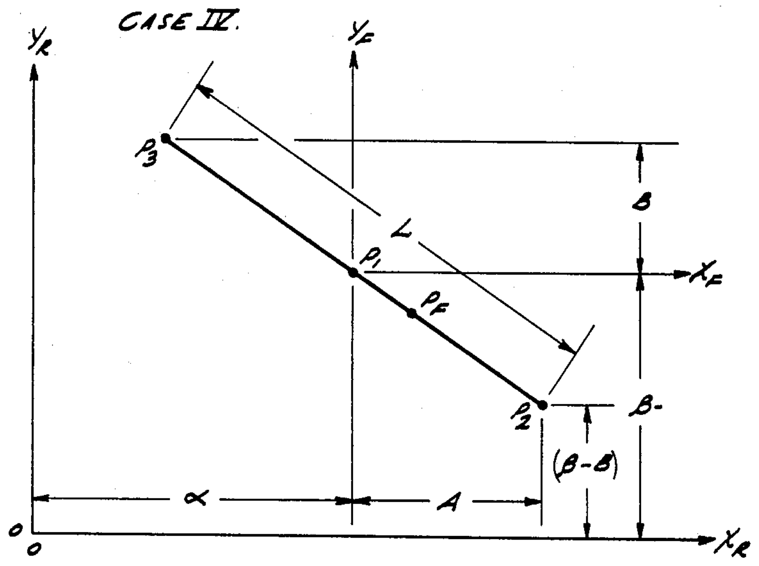
FIG. 10 is a graph of a straight line having negative slope in which the starting point $P_2$ for drawing the line is in the fourth quadrant of the coordinate system therefor.
Figure 11:
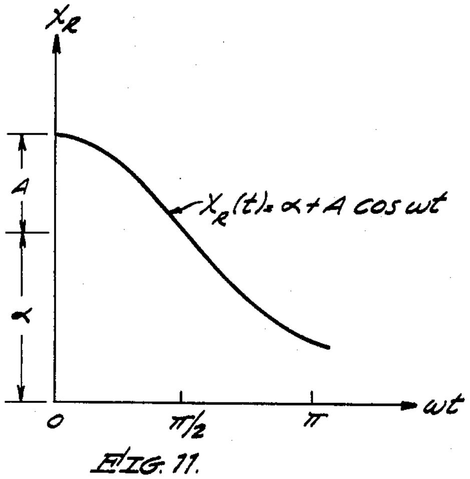
FIGS. 11 and 12 are graphs of time varying quantities depicting the instantaneous magnitudes of the coordinates of the line of FIG. 10.
Figure 12:
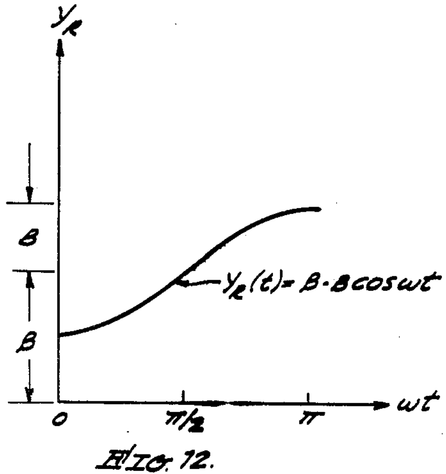

Case IV is the reverse of Case III. FIG. 10 shows the starting point $P_2$ of the line in the fourth quadrant of $X_F$, $Y_F$ and the terminating point $P_3$ in the third quadrant. A is initially positive and B is initially negative. Equations 16 and 17 defining this condition are depicted in FIGS. 11 and 12 in which $X_F$ varies between the extremes +A and −A, while $Y_F$ varies between −B and +B.

The line terminating function $Z(t)$ has been defined as a sinusoidal quantity used to terminate sin $\omega t$ or cos $\omega t$ at any selected value of $\omega t$ in one full cycle, one full cycle being 360°, as $Z(t)$ goes through zero from positive to negative, or the reverse, depending upon system requirements. With reference to Equations 5, 6 and 7 for a straight line $\phi=180°$. Also, $r=\frac{1}{2}L$ which is arbitrarily assigned the value 1. From (6), $C=1$ and from (7), $D=0$, whence, from (5), $Z(t)=C \sin \omega t$. This is plotted through $\omega t=\pi$ radians in FIG. 13, showing (from the definition of $Z(t)$ above) the termination of $\omega t$. This applies to each of Cases I through IV.

Sets of simultaneous Equations 18 and 19,, 20 and 21, 22 and 23, 24 and 25, described the four special cases in which circular arcs or circles are started on the respective sections of the axes $X_F$ and $Y_F$. In each instance, the $X_F$ and $Y_F$ coordinates of $P_F$ are expressable as a single product of one of A or B and sin $\omega t$ or cos $\omega t$. These equations have not been graphed and will be clearly understood from the explanations of a more general case which follows.

FIG. 14 depicts such a general case. Here, $\theta$ is an angle having its terminating side in the first quadrant, whence $P_2$, the starting point of a circular arc, is in the first quadrant of $X_F$, $Y_F$, $P_3$, the terminating point, is in the second quadrant. $\phi$ denotes the angle of arc and $r$ denotes the radius of the arc. $P_F$ is any point of the arc having the instantaneous coordinates.

$$X_F(t)=A \cos \omega t-B \sin \omega t \quad (42)$$
$$Y_F(t)=A \sin \omega t+B \cos \omega t \quad (43)$$

where assigned values of the quantities A and B may be positive or negative depending upon the quadrant in which the starting point $P_2$ is located. Since the functions $\omega t$, cos $\omega t$ are generated independently of $\theta$, respective different sine and cosine functions of $\omega t$ must be generated which are shifted in phase by an amount $\theta$ to provide the required values of $X_F(t)$ and $Y_F(t)$ at $P_2$ at time zero ($\omega t=0°$ or 180°). Equations 36 and 37 define this condition. Graphically, these equations define a transformation of the coordinate system A, B by rotation in the amount $\theta$ or, stated otherwise, define a shift of phase of $X_F(t)$ and $Y_F(t)$, the cosine and sine varying functions of $\omega t$, respectively, achieved by algebraically or graphically summing the individual terms in $\omega t$ in the respective expressions. FIGS. 15 and 16 show these conditions. Note that $X_F(t)$ and $Y_F(t)$ are shifted to the left by an amount $\theta$. In this case, for purposes of illustration, has been set equal to 30°. The radius $r$ may, for illustrative purposes, be any value, say 8 units, in which case, from (3) and (4), $A=4$ units and $B=6.93$ units. Corresponding points on $X_F(t)$ and $Y_F(t)$ define the coordinates of $P_F$ at any selected instant. It is to be understood that $X_F(t)$ and $Y_F(t)$ are algebraically summed with $\alpha$ and $\beta$, respectively, although not completely shown in FIGS. 15 and 16.

The angle $\phi$ represents the number of degrees in the circular arc between the starting point $P_2$ and the terminating point $P_3$. Terminating point $P_3$ is in the second quadrant. The quantity, $X(t)$, Equation 5, is the line terminating function. As a specific example, if $\phi=120°$ and $r=8$ units, from (6) and (7), $C=4$ units and $D=6.93$ units. FIG. 17 shows the plotting of these functions from which $Z(t)$, a sine varying function of $\omega t$, is obtained. Note that $Z(t)$ goes through zero from positive to negative at the point $\phi=120°$ and defines the length of the arc.

FIG. 18 is a graph of $Z(t)$ for $\phi=210°$; $r=1$. Here, $C=6.93$ units and $=D=-4.0$ units. Graphically summing the plots of C sin $\omega t$ and $-D$ cos $\omega t$ results in $Z(t)$ which passes through zero going from positive to negative at 210°. $P_4$ depicts this termination point in FIG. 14. Only the ratio of C to D is important, i.e., C and D need not be numerically scaled to define the coordinates of lines, radii, etc., as are A and B. Hence, $r$, in determining $Z(t)$ may always be unity, regardless of the value of $r$ in computing A and B.

FIG. 19 shows a circle in the reference plane having a starting point $P_2$ on $X_F$. It is convenient to start a circle of $X_F$ where $A=r$ which simplifies programming. Equations 18 and 19 which define this situation are graphed in FIGS. 20 and 21. In this situation $\omega t$ is generated from 0° to 360° and $\phi=360°$.

For this condition, from (6) and (7), $C=-1$ and $D=0$. Hence, $Z(t)=-C \sin \omega t$ which is plotted in FIG. 22 and passes through zero going from positive to negative at 360°, defining the terminal point $P_3$ at $P_2$, the starting point, to complete the circle. Pairs of Equations 20 and 21, 22 and 23, 24 and 25, define circles started and ended on positive $Y_F$, negative $X_F$ and negative $Y_F$, respectively. In these situations, $r=B$, $r=-A$ and $r=-B$, respectively.

In the interest of simplicity, ellipses or elliptical arcs will always be started on positive or negative $X_F$. $A \neq B$. A is always measured along $X_F$ and B along $Y_F$. If $A>B$, the major axis of the ellipse is on $X_F$ (FIG. 23). If $A<B$, the major axis of the ellipse is on $Y_F$ (FIG. 26). In this case $\theta$ always equals zero. Although the elliptical arc may be terminated at any point, i.e., $\phi<360°$, it will be assumed that $\phi=360°$ for defining a complete ellipse so that $P_2$ and $P_3$ coincide. Equations 34 and 35 define $X_R(t)$ $Y_R(t)$ for the special case above. FIGS. 24 and 25 plot $X_R(t)$ and $Y_R(t)$ for $A>B$ and FIGS. 27 and 28 plot $X_R(t)$ and $Y_R(t)$ for $A<B$. $Z(t)$ is the same as for a circle and may be seen by reference to FIG. 22.

Elliptical arcs or ellipses may be drawn in either direction from starting points on positive or negative $X_F$.

Since the starting point of an ellipse or of an elliptical arc is limited to positive or negative $X_F$, the sign of B may now be used to designate a direction of rotation in generating the line. Positive values of B result in generating lines from starting points $P_2$ on positive or negative $X_F$, having positive components in $X_Y$. Hence, from $P_2$ in positive $X_F$ when B is positive, the rotation is counterclockwise. When $P_2$ is in negative $X_F$, rotation is clockwise. When B is negative, rotation from positive $X_F$ is clockwise, and from negative $X_F$, rotation is counterclockwise. Equations 34 through 41 cover these four conditions.

For an elliptical arc the line termination function as described for the circular arc applies (see FIGS. 17 and 18 and the description therefor).

Note is made at this point that in drawing an ellipse the quantity B is inhibited in the system during the slewing mode of operation so that slewing to starting points on $X_F$ defined by $\alpha+A$ and $\beta$ is achieved. That is, although a value B is programmed, unlike positioning at starting points $P_2$ in drawing straight lines or arcs, where A and B when programmed are used to define $P_2$, B is now inhibited in slewing and appears only in the term $B \sin \omega t$ when the line is being drawn.

It should be noted that all of the time variable quantities as described hereinabove are inverted when employed in the system. $\alpha$ and $\beta$ appear as negative voltages. The quantities A, B, C, and D, when programmed as positive quantities actually result in negative time varying voltages. Sign changes are therefore consistent and the relationships of the quantities are unchanged from these set forth. The explanations as made facilitate both derivation and explanation of the several quantities.

The system is generally depicted in the block diagram of FIG. 29 which incorporates facilities for computing the various mathematical relationships described and graphed hereinabove in an electrical system of control wherein suitable output voltages are provided to move and position an output member to describe a geometric figure of the type defined by a particularly selected expression.

The arrangement includes a conventional magnetic tape reader which is generally designated TR and which includes a magnetic tape on which the input information to the system is suitably encoded. This will be described at a later point. The output of the tape reader is applied to a suitable, conventional type of pulse conversion circuit generally designated PC, the details of which are not illustrated in the interest of simplicity. This circuit converts the A.-C. magnetic head voltages to unidirectional voltage pulses suitable for driving flip-flops and applies the voltage pulses as inputs to a flip-flop type of shift register SR. The information for a particular figure which is to be drawn is contained in a complete block of information on the tape. FIG. 30 shows the tape format. This entire block of information is read and shifted into the shift register which produces the output signals, CA, for circular arc, EL, for ellipse, $\alpha$, the distance in $X_R$, $\beta$, the distance in $Y_R$, both $\alpha$ and $\beta$ denoting distances to the geometric center of the figure which is to be drawn, the C and D functions which are utilized to provide an indication of the end of a particular line, and the A and B signals indicating the coordinates in $X_F$ and $Y_F$, respectively, from the geometric center of the figure to the starting point $P_2$ of the line describing the figure.

These output signals are selectively combined in a suitable digital to analog circuit represented by the block identified DAC, to produce respective output voltages $E_X$ and $E_Y$ which at any instant respectively indicate the coordinates $X_R$, $Y_R$ in the reference plane, of particular points on the line describing the figure.

These output voltages are applied to an X–Y plotter involving a pair of position type servo systems having respective output motors for powering the output member in mutually perpendicular coordinate directions, the output member being connected to both of the motors to be controlled thereby. The digital-to-analog converter, DAC, also produces another time varying output voltage generally designated $E_Z$ [$Z(t)$ inverted] the time duration of which in passing through zero from a negative value to a positive value determines the length of a line. This voltage is related to the voltages $E_X$ and $E_Y$, as indicated in the equations hereinabove, through suitable functions of $\omega t$, the common parameter.

The digital-to-analog converted circuit is additionally controlled by a function generator, generally designated FG, which produces time varying voltages, $+E_R \sin \omega t$, $-E_R \sin \omega t$, $+E_R \cos \omega t$ and $-E_R \cos \omega t$.

As discussed hereinabove, these time varying voltages are selectively combined to produce the time varying voltages $E_X$ [$X(t)$ inverted] and $E_Y$ [$Y(t)$ inverted] in the digital-to-analog converter. Details of this will appear hereinafter. For the moment, the function generator may be described generally as a double integrator type of oscillator circuit the frequency $\omega$ of which is controlled by suitable attenuating networks. The attenuating networks in turn are controlled by selected discrete signals of the quantities A and B from the shift register whereby the frequency of the function generator is roughly inversely proportional to the length of the line to be drawn. Selected signals of the quantities A and B are additionally applied along with the signal, $-E_R \cos \omega t$, to an analog control circuit AC which produces an output signal for controlling the pen on the X–Y plotter. This pen, as will be described, is movable between retracted and pen down, or drawing, positions. In the pen down position the pen engages the surface of the drawing board so that a line may be drawn. This pen down signal is terminated by the signal $E_Z$ and/or other signals identifying line characteristics which determine the specific character of a line which is to be drawn, that is, a dash line, a center line, a phantom, or section, line, etc.

The system is illustrated in greater detail in FIGS. 31*a*, 31*b* and 31*c* viewed together. The organization of these different figures is represented in FIG. 31. FIG. 31*a*, with reference to the shift register SR, indicates the full complement of signals which is to be generated by the digital portion of the system. This includes, in addition to those indicated in FIG. 29, the signals AS*n*, BS*n*, CS*n* and DS*n*. This group of signals denotes, respectively, the signs positive or negative of the A, B, C and D signals.

This information, as illustrated in the tape format, FIG. 30, is encoded on a tape which may include seven different columns. One practical embodiment of this invention employs a magnetic tape and magnetic tape reader. This invention is described in accordance with such an arrangement. The tape is divided into longitudinal sections respectively designated $\alpha$, $\beta$, A, B, C, D, LA and DA. The characters LA and DA designate line address and drawing address, respectively. Each of the signals $\alpha$ through D are identified by 14 bits of information, which are weighted according to the convention, $2^{-1}$ through $2^{-14}$, for each of the 14 bits. The numerical designations in the squares of the tape format, equal X in the expression $2^{-X}$ which denotes the ratio of full scale value. The selection of this notation is necessitated by the requirements of the analog to digital converter which will be described hereinafter.

Inasmuch as $\alpha$ and $\beta$ are dimensions in the coordinates $X_R$ and $Y_R$, respectively, of the reference plane, in which $X_R=0$ and $Y_R=0$ is in the lower left corner, the signs of $\alpha$ and $\beta$ are always positive; hence, a sign indicating signal is not needed for these quantities. Each section of information $\alpha$, $\beta$, etc., involves five columns of information extending through three rows providing positions for 15 bits of information. The 15th or $2^0$ bit of information in the $\alpha$ information section of the tape is used to designate a circular arc, identified CA in the tape format. This has place significance on the tape and is connected with a particular channel of the shift register to be stepped to a particular flip flop. Similarly, in the $\beta$ information section the space EL designates the ellipse. The presence of a magnetic spot here indicates that an ellipse is to be drawn. In the information sections for the quantities A, B, C and D, the extra space for recording of information is used to designate the sign of the respective quantities. The absence of a magnetic spot in any one of the spaces designated SN indicates the number is positive. The presence of a magnetic spot indicates the quantity is negative.

The line address section LA may be organized in any convenient manner. Fifteen information recording spaces are available for recording data as to a particularly selected line. Each line of a specific drawing has a particular number. Hence, any line of a drawing may be selected by the line identification code. The section DA, set aside for the drawing address includes 10 spaces for recording of information, one of which is designated $B>A$ and is used in one embodiment of this invention to control the application of selected discrete signals of the quantities A or B, whichever represents the quantity of greater magnitude, to the function generator attenuator networks for the purpose of controlling the frequency, $\omega$, of the output. A slow pen represented by the character SP may also be programmed here. When more than one drawing is recorded on a tape, the drawing code identifies each drawing.

The last recorded row of information includes the space marked TK and TN denoting thick pen and thin pen, respectively, PH for phantom line, HI for hidden line, and CE for center line.

The tape is read from left to right as viewed in FIG. 30 so that the last row of information which is read and which is stepped into the shift register will be that row of information including the designation CA for circular arc. The system is synchronized by means of a clock pulse train which is generated from a clock pulse column of the tape. This is designated as column 4 but may be any column thereon. The tape sprocket is conveniently used for this purpose in many instances.

Additionally, provision may be made for parity checking. Lateral parity checks may be made in a column of the tape here designated column 7 and may be odd or even as desired. Similar considerations apply also to longitudinal parity which may be even or odd as desired. Such features are not covered herein.

Any conventional type of shift register may be employed. This is shown only in block form in FIG. 31*a*. One suitable type is schematically represented in FIG. 32.

Such a shift register may include 5 flip flop channels, each comprising 24 flip flops in correspondence with the number of information rows on the tape. These flip flops are designated 1F1 through 1F24, 2F1 through 2F24, 3F1 through 3F24, 5F1 through 5F24 and 6F1 through 6F24. The first digit of each of these designations corresponds to the column of the tape with which it is associated. The tape reader is schematically represented at the top of this figure and comprises a plurality of tape reading heads H1, H2, H3, H5 and H6 for each of the information columns and a head H4 for the clock pulse column of the tape. The outputs of these heads may be applied through suitable pulse shaping circuits PC1, PC2, PC3, PC5 and PC6 to respective asynchronous flip flops which are controlled as to frequency by the rate at which the tape is operated and which are rapidly reset in the interval between each tape information row by a suitable gated delayed clock pulse GCP as indicated, whence, subsequent to the setting of one of these flip flops by reading of information from the tape, the subsequent clock pulse application resets the flip flop to restore it for the next information row on the tape.

These asynchronous flip flops are called read flip flops and are identified 1RF, 2RF, 3RF, 5RF and 6RF. Their respective outputs are applied to the inputs of correspondingly numbered flip flops of the shift register channels. The output of the clock pulse read head H4 is similarly coupled to a pulse converter or pulse shaping circuit PC4 producing a clock pulse CP. Clock pulse CP is coupled to an asynchronous clock pulse driven flip flop CPF which develops a clock pulse synchronized voltage state signal for system timing. This signal is applied to a suitable delay circuit which may include a one shot multivibrator which drives a clock pulse generator CPG producing a delayed clock pulse DCP. This delay is to insure the proper setting of the read flip flops which may be delayed (relative to the clock pulse signal) due to skewing of the tape during reading. The clock pulse generator output is also applied to an "and" gate, the other input of which is controlled by a shift control flip flop, FQ1, which produces the gated clock pulse signal, GCP, applied to the flip flops of the shift register, SR, to switch these flip flops in suitable time phase synchronism with the incoming information to shift the information through the respective flip flops of the respective channels until the tape is completely read and the shift register is full of the information from the tape.

The type of shift register circuit which may be employed is depicted in part in greater detail in FIG. 33 which shows the first few flip flops in each of the 5 columns. These are standard flip-flop circuits having two input and two output circuits. The outputs of the read flip flops are applied to the respective inputs of each of the flip flops 1F1, 2F1, 3F1, 5F1 and 6F1 to switch these flip flops in synchronism with the switch of the outputs of the asynchronous flip flops. The corresponding outputs and inputs of the successive flip flops are coupled together through "and" gates which gate clock pulses GCP whenever the flip flop signals thereon are at gating voltage level, to form five shift register channels. There is a finite delay in the switching time of each flip flop. Reading of the tape is synchronized with the flip flop switching period by the gated clock pulses GCP so that information is read from the tape and stepped in sequence through the shift register. Thus, the magnetic heads H1, H2, H3, H5 and H6 drive the respective read flip flops which in turn, through the pulse conversion circuits, drive the respective flip flops of the first row of the shift register. Thereafter the information in the first row of flip flops is stepped to the second row of flip flops with the occurrence of the gated clock pulse signal GCP for the shift register. This sequence continues until the tape is completely read, at which time the information in the tape is stored in the respective flip flops. Suitable amplifiers (not shown) associated with each of the flip flops may be employed to provide electrical outputs as required.

Before reading the tape, flip flop 1F1 is set to its 1Q1 state (its "1" representing state) and flip flops 1F2 to 1F24 are set in their "0" representing states, $1\overline{Q}2$, $1\overline{Q}3$, etc. On the 23rd clock pulse the "1" stored in flip flop 1F1 is shifted into flip flop 1F24 which changes to its "1" representing electrical state, 1Q24. As will be explained at a later point, this signal is used to generate a tape stop signal at the time the 26th clock pulse occurs, (FQ7 is switched to its "1" state), if the system is not in its line selection or drawing selection modes of operation, or if in such modes if a signal indicating line or drawing coincidence exists. The other shift register flip flops are not pre-set prior to reading the tape. FIG. 33 shows resetting signals applied to the K input terminals for setting these other flip flops in their "0" or $\overline{Q}$ electrical states.

As will be seen by reference to FIGS. 32 and 33, after the tape has been completely read and all the information has been shifted into the shift register, the first row of flip flops contains the information in the row of the tape which was last read. Hence, flip flop 1F1 is set according to the information in the space on the tape marked CA and will produce a signal on its "1" representing output terminal 1Q1, for instance, when a circular arc is desired. If there had been no magnetic spot recorded in the spot CA on the tape the flip flop would have been in its zero representing state with terminal $1\overline{Q}1$ high and terminal 1Q1 would have been at the other, or, the lower one of its two voltage states. Similar considerations apply to the information stored in flip flops 2F1, 3F1, 5F1 and 6F1 producing electrical output signals $\alpha^{-1}$, $\alpha^{-2}$, $\alpha^{-3}$ and $\alpha^{-4}$. The second row of flip flops 1F2, 2F2, 3F2, 5F2 and 6F2 produces electrical signals $\alpha^{-5}$, $\alpha^{-6}$, $\alpha^{-7}$, $\alpha^{-8}$, $\alpha^{-9}$ and the third row of flip flops 1F3, 2F3, 3F3, 5F3 and 6F3 produces electrical signals, $\alpha^{-10}$ through $\alpha^{-14}$, which covers all of the digital information for the $\alpha$ information group. These are bi-level signals.

Similar considerations apply to the $\beta$, A, B, C, D, etc., sections of the register. These are not illustrated in FIG. 33 in the interest of simplicity.

In the combined showing of FIGS. 31*a* through 31*c* the outputs of the shift register designated as quantities $\alpha$, $\beta$, A, B, C, D, line address, LA, drawing address DA, and pen instruction, are represented as single conductors. These will be understood to represent cables including as many conductors as are necessary to handle all of the discrete signals which are present in a single quantity. As will be seen, these signals are applied to the relays of the respective ladder sections $L\alpha$, $L\beta$, LA, LB, LC and LD and are employed to set particular relays associated with each of these signals. Selected discrete signals of the quantities A and B are also applied to relays K1 through K5 in the attenuator sections of the function generator FG for controlling the frequency $\omega$ of the time varying output voltages. These selected signals are indicated at the bottom of the shift register SR in FIG. 31*a* and are designated, respectively, $A^{-2}$ through $A^{-6}$ and $B^{-2}$ through $B^{-6}$. Additionally, the circular arc command signal CA is applied to this relay group for a purpose to be explained hereinafter. Relay K6 is controlled by the line characteristic signal LCH or by a tape initiated slow pen signal SP and, by itself, reduces the frequency $\omega$ of the function generator by about 3:1.

The several ladder networks illustrated are typically represented by a detail showing of one of the ladders in FIG. 34. This may be referred to as the ladder LA for convenience and comprises attenuator sections LA1 and LA2, respectively, which are selectively controlled by the "*a*" contact group and the "*b*" contact group, respectively, of relays AR1 through AR14. Relays AR1 through AR14 in this instance are controlled by the application of signals such as $A^{-1}$ through $A^{-14}$ designating as a group by their electrical configuration in one or the other of their two voltage states a particular magnitude of the quantity A which, it will be recalled, designates a particular distance $X_F$, as described. Two networks are employed to provide electrical isolation between outputs from the LA1 and LA2 sections since these are used in generating the $E_X$ and $E_Y$ voltages, respectively. However, the LA1 and LA2 sections are identically set in correspondence with a selected magnitude represented by the quantity A.

A network of this general type is completely described in Patent No. 2,718,634. The circuit of FIG. 34 differs from the patented circuit in the use of separate resistors in the contact circuits between one pole of each contact and ground and the other pole of each contact and the input signal terminal $E_S$, in each instance. In the patent a single resistor is connected in the circuit between the individual contacts and the tapped sections of the resistor attenuator. The resistors, as shown, prevent shorting the signal $E_S$ to ground in the event make-before-break at any contact should occur.

The network provides attenuation of a time varying or fixed supply voltage $E_S$ applied to the network, dependent upon the energization pattern of the relays AR1 to AR14. FIG. 34 indicates the application of a supply or signal voltage $E_S$ to each of the input terminals. It will be appreciated that this need not be a fixed positive voltage. The voltage may also be a negative voltage with respect to ground. Additionally, as will be seen hereinafter, time varying signal voltages are applied to the input terminals of the resistor attenuators of the ladder networks LA, LB, LC and LD to be amplitude modulated in accordance with the setting of the resistor attenuators. The networks LA1 and LA2 are grounded and their electrical outputs are zero when all of the relays are de-energized.

The function generator FG is illustrated in FIG. 35. This is a double integrator type of oscillator circuit, the peak amplitude of which is determined by finite reference voltages and the frequency of which is controlled in accordance with the writing speed limitations of the plotter. The function generator includes respective high gain, low drift integrator amplifiers IA1 and IA2, respectively shunted by integrating capacitors C1 and C2, and respective operational amplifiers OA3 and OA4, the latter functioning primarily as inverters in the circuit and providing unity gain. A circuit of ths type is known in the art and is conventionally employed as an oscillator.

The circuit illustrated differs from prior art arrangements in that the inputs to the integrating amplifiers IA1 and IA2 comprises the variable resistor attenuator networks RA1 and RA2, respectively. These networks each comprise individual series connected resistors, each of which may be shunted according to a predetermined pattern of discrete signals $A^{-2}$ through $A^{-6}$, or $B^{-2}$ through $B^{-6}$, depending upon which of B or A is the greater, as indicated in the space provided on the tape, in the tape format. The output of amplifier IA1 is connected by a resistor R1 to the input of the resistor attenuator network RA2. The output of amplifier OA4 is coupled through a resistor R2 to the input of the resistor attenuator network RA1 to complete the loop. The resistance of the respective networks is controlled by the contacts of relays K1, K2, K3, K4 and K5. These relays are energized by the invidual signals of the quantities A or B, depending upon a relay K51. If the quantity A is greater than the quantity B this relay is de-energized and the respective A signals are applied to the relays K1 through K5. On the other hand, if the quantity B is greater than the quantity A, relay K51 is energized and the respective signals of the quantity B individually control the energization of the respective relays K1 to K5. The "*a*" contacts of the respective relays control the shunting of the resistor sections of the resistor attenuator network RA1 and the "*b*" contacts of this group of relays control the shunting of resistors of the resistor attenuator network RA2. These are set in exactly the same ratio to maintain the desired unity relationship between the sine and cosine output voltages of the generator. The frequency $\omega$ is controlled by setting the attenuator networks to an approximation of half of the length of a straight line, or the radius of a circular arc, or half the length of an axis of an ellipse, as the case may be. The outputs are represented at their respective output terminals as follows: terminal T1, $-E \cos \omega t$; terminal T2, $+E \cos \omega t$; terminal T3, $+E \sin \omega t$; and terminal T4, $-E \sin \omega t$.

Relay K7 controls the operation of this function generator. In its de-energized condition the contacts K7*a* and K7*b* connect the input circuits of the amplifiers IA1 and IA2 through resistors R3 and R4 to −48 volts and ground, respectively, and when relay K7 is de-energized terminals T1 and T2 are approximately −48 volts and +48 volts, respectively. Terminals T3 and T4 are at zero or ground potential. The function generator is now caged and is reset. During this interval relays K1–K6 are selectively energized setting the attenuators RA1 and RA2 to establish the loop gain of the function generator and thereby control the frequency of oscillation. When the relay K7 is energized contacts K7*a* and K7*b* connect the integrators IA1 and IA2 and the amplifier OA4 in a loop to form a double integrator oscillator which "free runs" and generates an output voltage having an amplitude governed by the reference voltage (−48 volts) and a frequency determined by the setting of the attenuator networks RA1 and RA2. In one embodiment the frequency is controlled over a range of 0.5 rad./sec. to 8.0 rad./sec. in five steps which maintains writing speed at about 4 in./sec.

Each integrating amplifier is provided with a convergence-divergence network CN. These networks have respective convergence potentiometers CP1 and CP2 having adjustable taps which are each resistor coupled to the input circuits of the respective integrator amplifiers forming feedback loops to compensate leakage resistance of the adjustable integrating capacitors C1 and C2. Adjustment of the potentiometer taps compensates this condition. This adjustment is made by programming a circle and noting whether the line diverges or converges radially and thereafter adjusting CP1 and CP2 to achieve closure.

There is one other way in which the frequency of oscillation of the function generator is controlled. This is provided by a relay K6 which includes a pair of normally open contacts K6*a* and K6*b*. These contacts shunt respective resistors R5 and R6 forming part of the terminating impedances of the respective networks RA1 and RA2. These resistors R5 and R6 are selected of such value that when relay K6 is energized, network attenuation is changed in an amount to reduce the frequency of oscillation, $\omega$, by about 3:1. As indicated, this relay is controlled by a slow pen signal designated SP which may be programmed on the tape and coupled to the coil of relay K6 through an appropriate flip flop in the shift register and circuits associated therewith. This relay may also be controlled by a contact K16*a* of relay K16 (see FIG. 31*a*). Relay K16 is energized at any time that a line character signal LC*h* exists for a dotted or dashed line, center line, section line, or any broken line where it is desirable to reduce pen speed. Under these circumstances contact K16*a* is closed which energizes relay K6 to appropriately change network attenuation.

As noted in the brief description of the invention hereinabove, provision is made for anticipating line termination in proportion to pen speed. To this end an anticipation network RA3, comprising resistor sections selectively shunted by contacts K1*c* to K5*c*, is coupled to a supply of voltage, say 200 v., as shown, to produce an anticipate output bias, coupled to the input circuit of an amplifier ZA, yet to be described, in dependence upon the frequency setting of the function generator under the control of relays K1 to K5, in turn controlled by the quantities A or B as described. Contacts K6*c* of relay K6 ground the anticipating network when slow pen relay K6 is energized to remove the anticipate bias.

An alternative arrangement for controlling the energization of relays K1 through K6 is illustrated in FIG. 36. The arrangement here provides a different setting of the attenuator networks than is obtained with the arrangement illustrated in FIG. 35. This offers an advantage in the sense that it is unnecessary for the programmer to note in advance that B is greater than A and record this as a magnetic spot in the appropriate position on the tape. As seen in FIG. 36, the signals $A^{-2}$ and $B^{-2}$, $A^{-3}$ and $B^{-3}$, $A^{-4}$ and $B^{-4}$, $A^{-5}$ and $B^{-5}$, $A^{-6}$ and $B^{-6}$ are coupled in the pairs indicated to the coils of the respective relays K1, K2, K3, K4 and K5 in individual circuits, each including a respective one of the series polarizing diodes D1*a*, D1*b*, D2*a*, D2*b*, D3*a*, D3*b*, D4*a*, D4*b*, D5*a*, D5*b*. Additionally, relay K5 has applied thereto the circular arc signal CA through a separate polarizing diode D5*c*. Relay K6, which is again used to reduce the frequency, $\omega$, by about 3:1, has a first signal designated SP coupled thereto by a diode D6*a*, and a second signal LC*h*, the line characteristic signal coupled thereto through a diode D6*b*. The slow pen signal SP may be derived from the tape, as aforesaid, through a corresponding shift register flip flop and circuits associated therewith.

With the circuit arrangement shown in FIG. 36 it will be apparent that if both of the quantities A and B exist the relay network will be controlled by the discrete signals of both of the quantities. Under some circumstances a straight line may be drawn on $X_F$, or a circular arc started on $X_F$, either positive or negative. In this circumstance the quantity A exists but there is no quantity B. The relays are therefore controlled solely by the discrete signals of the quantity A. Similarly, if a straight line is drawn on, or, a circular arc is started on the $Y_F$ axis only the quantity B will be in existence and the relays will be controlled exclusively by the discrete signals of the quantity B. Under still another circumstance, if a line or circular arc is to be started at a point in which $A=B$, both of the quantities exist and the discrete signals of both of the quantities will appear simultaneously on the two inputs of certain of the relays. For other conditions when A and B are not equal, there will be a different application of signals. The arrangement here is such as to provide a control of the attenuators approximating the longest length of line, as represented by the approximation of the coordinates in $X_F$ and $Y_F$ afforded by the selected signals of the quantities A and B.

In one embodiment of this invention, the reference voltages which are applied to the ladder attenuators LA and LB of the digital-to-analog converter circuits are negative voltages. Similarly, negative voltages are employed in the function generator. Hence, the outputs of these networks as combined in the summing junctions XJ, YJ and ZJ, if expressed in terms of numerical values of voltages as generated would result in values of voltages $E_x$, $E_y$, etc., which are inverted relative to those shown in FIGS. 1 to 28. However, these voltages are thereafter inverted in the respective summing amplifiers XSA, YSA and ZSA shown in FIG. 31*b*. Hence, the discussions herein will refer to the voltages appearing at the outputs of these respective amplifiers.

The convention is adopted herein that sign representing relays K47, K48, K49 and K50 controlled by respective sign signals AS*n*, BS*n*, CS*n*, and DS*n* will be normally de-energized when the corresponding quantity A, B, C, or D is positive. When the quantity is negative, a magnetic spot is applied to the tape in the appropriate position to generate a signal necessary to energize the selected relay to thereby invert the time varying voltage which is selected.

The equations which follow, instead of being written in negative terms as appearing at the respective summing junctions, are written in positive terms, and for practical purposes represent the respective outputs of the summing amplifiers. Hence, each negative term as generated is a positive term in the equation as written, and each positive term as generated is a negative term in the equation as written.

When straight lines are to be drawn, both the circular arc relay K21 and the ellipse relay K22 are de-energized. Contacts K21*a* and K21*b* of the circular arc relay ground the input circuits of the attenuator networks LA2 and LB1 leaving only the attenuator network LA1 applicable in generating the $E_x$ voltage, that is, functioning with associated circuits as a circuit means coupling one output of the functioning generator FG to the motor XM, and the attenuator LB2 applicable in generating the $E_y$ voltage, that is, functioning with associated circuits as a circuit means connecting said one output of said function generator FG, or an output of the function generator FG which is 180° out of phase with said one output, to the motor YM, in addition to the $L_\alpha$ and $L_\beta$ networks. The voltage appearing at the output of amplifier XSA under these conditions may be expressed as follows:

$$E_x=E_\alpha+E_{A1}\cos\omega t \tag{44}$$

which it will be noted corresponds exactly to Equation 8 hereinabove. The voltage appearing at the output of amplifier YSA is as follows:

$$E_y=E_\beta+E_{B2}\cos\omega t \tag{45}$$

Note that in each instance the time varying voltages selected at the function generator are negative and that the outputs of the ladder attenuators $L_\alpha$, $L_\beta$ are also negative. These, when inverted in the respective amplifiers XSA and YSA have the relationships indicated in Equations 44 and 45. These equations depict a line having a starting point in the first quadrant of the coordinate system $X_F$, $Y_F$ and terminating at a corresponding point in the third quadrant of $X_F$, $Y_F$ as explained hereinabove. $E_\alpha$ represents the coordinate distance $X_R$ to the center of coordinate system $X_F$, $Y_F$ which is the center of the line which is to be drawn and $$E_{A1}\cos\omega t$$

represents coordinate distances in the coordinate system $X_F$, $Y_F$ of the actual figure or line which is to be drawn. Similar considerations apply to the expression $$E_\beta+E_{B2}\cos\omega t$$

Equations 44 and 45 depict a line of positive slope as defined herein.

The same line may be drawn by starting in the third quadrant of the coordinate system $X_F$, $Y_F$. The quantities A and B are both negative in this situation and the slope is positive, as defined herein. Hence the tape will be suitably marked to indicate negative values of the quantities A and B and the signals AS*n*, BS*n* result in energization of both relays K47 and K48. The voltages $E_x$, $E_y$ may now be expressed as follows:

$$E_x=E_\alpha-E_{A1}\cos\omega t \tag{46}$$

and $$E_y=E_\beta-E_{B2}\cos\omega t \tag{47}$$

It will be noted that Equations 46 and 47 correspond respectively to Equations 12 and 13 hereinabove.

The two conditions for negative slope, as defined herein, in which the line is started, respectively, in the second quadrant and in the fourth quadrant, as defined in pairs of Equations 14 and 15, 16 and 17 hereinabove, will be evident from previous explanations.

When it is desired to draw a circular arc, circular arc relay K21 is energized. Contacts K21*a* and K21*b* now switch the input circuits of attenuator sections LA2 and LB1 of respective ladder attenuators LA and LB from ground to the function generator to receive the time varying output voltages of the function generator. Contacts K21*c* switch the input of a line characteristic generator LCG from the voltage, $-E_R\sin\omega t$, to a fixed reference voltage. This is disclosed at a later point. If a circle is to be started in the first quadrant and has a starting point $P_2$ defined by positive coordinates A and B, sign relays K47 and K48 will be de-energized as shown. The output voltage $E_x$ at the output of summing amplifier XSA will be $$E_x=E_\alpha+E_{A1}\cos\omega t-E_{B1}\sin\omega t \quad (48)$$

The equation for $E_y$ will be $$E_y=E_\beta+E_{A2}\sin\omega t+E_{B2}\cos\omega t \quad (49)$$

Note again in writing these equations that all of the signs have been changed from those indicated in the drawing to represent the output at the respective X and Y summing amplifiers. These equations it will be noted are the electrical counterparts of Equations 26 and 27 hereinabove. The equations for circular arcs which are started in the second, third and fourth quadrants of the coordinate system $X_F$ and $Y_F$ may be determined in the same manner, resulting, respectively, in pairs of Equations 28 and 29, 30 and 31, and 32 and 33, hereinabove, defining each of the conditions mentioned.

If a circular arc or circle is to be started on any one of the coordinate axes as described in connection with Equations 18 through 25 hereinabove, the relays will again provide the proper combination of voltages to control the servo. For instance, if a circle is to be started on positive $X_F$, the quantity A is positive and the quantity B is zero. The circular arc relay is again energized and the following equations may be written.

$$E_x=E_\alpha+E_{A1}\cos\omega t \quad (50)$$
$$E_y=E_\beta+E_{A2}\sin\omega t \quad (51)$$

In Equations 50 and 51 it will be noted that only the voltage terms from attenuator sections LA1 and LA2 appear. Since the quantity B was zero, all of the relays of the attenuator sections LB1 and LB2 of ladder attenuator LB are de-energized. The outputs of these attenuators are now grounded and are effectively zero under these circumstances. Similar considerations apply to starting of a circle on either the positive or negative sections of the $Y_F$ axis and on the negative portion of the $X_F$ axis. The relay K21 and associated circuits may be regarded as a circuit means for interchanging or selectively connecting the time varying voltages to the motor YM.

When it is desired to draw an ellipse, this is designated by appropriately magnetizing the magnetic tape resulting in the production of signal EL and energization of the ellipse relay K22. This relay controls contacts K22*a* through K22*d*. Contact K22*a* switches the input to the attenuator section LB2 from the cosine voltage output terminals of the function generator to the sine voltage output terminals of the function generator, controlled by contacts K48*a* of the B sign relay, K48. Contacts K22*b* in series with contacts K21*c* switch the input of the line characteristic generator circuit LCG from the voltage $-Er\sin\omega t$, of the function generator to the fixed reference voltage $E_R$ for a purpose to be described at a later point. Contacts K22*c* and K22*d* interchange the voltages $$+Er\sin\omega t$$

and $$-Er\sin\omega t$$

between the two poles of contacts K48*a* to provide the proper voltage polarities for drawing the ellipse. The ellipse is always started on either the positive $X_F$ or negative $X_F$ axis and, unlike the circle or circular arc which is always drawn in a counterclockwise direction, may be selectively drawn clockwise or counterclockwise from either of its starting points along positive or negative $X_F$. Assuming that the ellipse is started at $P_2$ on positive $X_F$ and that both A and B are positive, and recalling that the relay K22 is now energized, the following equations may be written, again with reference to the output of amplifiers XSA and YSA (see also Equations 34 and 35), $$E_x=E_\alpha+E_{A1}\cos\omega t \quad (52)$$

and $$E=E_\beta+E_{B2}\sin\omega t \quad (53)$$

If A is greater than B the ellipse will appear as depicted in FIG. 23 and for the condition A+, B+ will be generated counterclockwise beginning at $P_2$ and terminating at $P_3$ which are coincident on $X_F$. If B had been greater than A the ellipse would appear as in FIG. 26 and would be generated in a counterclockwise direction with the starting point $P_2$ and stopping point $P_3$ coincident on $X_F$. If it had been desired to draw an elliptical arc in the same direction the quantity $E_z$ would have been utilized to stop the counterclockwise direction of the ellipse from $P_2$ on positive $X_F$ when the desired arc had been drawn. The ellipse may be generated in a clockwise direction from $P_2$ on positive $X_F$ by the simple expedient of designating the quantity A positive and the quantity B negative (Equations 36 and 37). This results in the generation of the following electrical quantities $$E_x=E_\alpha+E_{A1}\cos\omega t \quad (54)$$
$$E_y=E_\beta-E_{B2}\sin\omega t \quad (55)$$

If the ellipse is started on negative $X_F$ and is to be drawn clockwise the quantity A is negative and the quantity B positive (Equations 38 and 39). If started at the same point and drawn counterclockwise both quantities A and B are negative (Equations 40 and 41). These expressions may be written directly from the circuits herein illustrated, assuming appropriate energization and de-energization of the respective A and B relays to achieve the results desired. It will be observed that like the circular arc relay K21, the ellipse relay K22 and associated circuits also interchanges or selectively connects the time varying voltages with one of the motors, in this case the Y motor YM.

The servos which drive the X and Y inputs of the X–Y plotter, generally designated XYP, are conventional in character. These are amplifier powered position servos in which an input voltage representing a desired position is compared with a feedback voltage representing an actual position. In the system herein described the drawing speeds, under all circumstances, are sufficiently low and the output voltages of the digital-to-analog converter as applied to the inputs of the X and Y servo are of sufficiently low frequencies, that the servo is able to follow the time varying input voltages with very small error. These servos regulate continuously for zero error between the input and feedback voltages and thus effectively trace a voltage to generate a line all points on which are represented jointly by the instantaneous X and Y coordinates of the respective input voltages. Each servo comprises an input summing amplifier. These are respectively designated XSA and YSA. The output of each amplifier is applied in opposition to respective feedback voltages tapped from potentiometers XP and YP across respective input resistors XR and YR for chopper circuits XC and YC, respectively. The respective taps of the potentiometers are driven through suitable gearing arrangements in each case, by the X motor, XM and Y motor, YM, so that the voltages tapped from the respective potentiometers accurately represent the actual position of the member driven thereby. The potentiometers are energized by respective voltage sources identified XS and YS, respectively, here represented as batteries in the interest of convenience. The voltage across the potentiometer in each case represents the longest line which can be drawn in either the X or Y coordinate directions of the plotting board. If the outputs of the summing amplifiers swing between a relatively small negative voltage, say −.2 volt and a positive voltage of the order of +28 volts, the voltages across the feedback potentiometers will correspond approximately to this range of voltages, say of the order of 28 to 30 volts with respect to ground.

The servo motors XM and YM are two-phase servo motors provided with respective fixed field windings XF1 and YF1, which, as indicated, are energized with 400 cycle alternating current. The respective choppers XC and YC are controlled by 400 cycle alternating current and are therefore synchronously operated with the motor supply voltage. The output of each of the choppers is amplified in respective motor amplifiers XMA and YMA as indicated. These amplifiers power the control field windings XF2 and YF2, respectively, which produce the quadrature fields producing motor torque and rotation.

The chopper circuits are identical. One, the chopper circuit XC, is depicted in FIG. 37 where one terminal of the input resistor XR is applied to the heel of a vibrating contact which is magnetically actuated between each of two stationary contacts by means of a 400∼ alternating current energized winding, W1. The other terminal of resistor XR is applied to a center tap of a primary winding P1 of a transformer, generally designated T1. A secondary winding S1 of transformer T1 is connected between ground and the input to amplifier XMA, for example. By this expedient the error voltage appearing across the input resistor XR is switched between the center tap and the opposite ends of primary winding P1, synchronously with the 400 cycle supply voltage to generate a 400 cycle alternating current voltage in the secondary winding S1 of the transformer, the phase of which reverses with reversals in polarity of the error voltage appearing across resistor XR.

The control of the pen for line termination is provided by the voltage $E_Z$ which is indicated at the summing junction ZJ. This voltage represents the algebraic sum of the voltage outputs of the ladder attenuator networks LC and LD . These networks are controlled by individual voltages of the C and D quantities produced by the shift register, as seen in FIG. 31*a*, and sine and cosine time varying voltages of one polarity or the reverse are applied by contacts K49*a* and K49*b* of relays K49 and K50, in turn controlled by the sign signals CS*n* and DS*n* representing, respectively, the signs of the quantities C and D, to the LC and LD networks. The significance of the C and D quantities has been explained hereinabove. The line terminating equation is identified as Equation 5. FIG. 13 depicts a special form of the line terminating quantity for a straight line. FIGS. 17 and 18 depict the line terminating quantity for a more general situation and FIG. 22 shows the line terminating quantity for the case of a full circle or a full ellipse, as the case may be. As discussed, line termination is desired at the time that the quantity $Z(t)$ goes through zero, passing from negative to positive at the input to amplifier ZA. The quantity $Z(t)$ characterizes the voltage $E_z$ for any of the cases named.

Line start and termination is provided by a pen control circuit PCC which includes a pair of bistable amplifiers. The first of these, which receives the voltage $E_z$, at its input, is identified ZA. The second of these, which receives the output of the first, is designated ZA2. For the purposes of this discussion these amplifiers may be assumed to be identical. Each is a high gain amplifier having its input and output circuits connected to the terminals of a diode network or bridge including a pair of zener diodes D7 and D8 in adjacent legs. Diode D7 is connected between the output of the amplifier *Za* and a resistor which is connected to a positive voltage supply. Diode D8 is similarly connected between the output of the amplifier *Za* and a resistor connected to a negative volt supply. As indicated, the diodes are backbiased and serve to clamp the output of the amplifier at output voltage levels of approximately +28 v. or −28 v. as determined by the input voltage. The amplifiers are switched by small excursions of input voltage on either side of zero volts. The output of amplifier ZA is differentiated in a differentiating circuit including a capacitor C7 and a resistor R12 which is connected between the output terminal of the capacitor and ground. The output terminal of capacitor C7 is connected through a resistor R13 and the normally open contacts K11*c* of a relay K11 to the input of amplifier ZA2. The output of amplifier ZA2 is resistor coupled into the base of a transistor Q1, the emitter of which is connected to a pen control mechanism generally designated PM, the details of which appear in FIG. 38.

The pen control mechanism comprises a movable pen lever 10 pivotally mounted in a bracket 11 on a plate 12 extending from a support 13 which is powered by both motors. A second lever 14 pivotally mounted in a bracket 15 on the support 12 has its end flexibly connected to the end of lever 10 by means of a flexible connection 16. A magnet 17 when energized attracts and rotates lever 14 clockwise about its pivot in bracket 15 rotating lever 10 counterclockwise, dropping the pen. The pen is spring loaded to retracted position by a suitable spring 18 which rotates lever 14 counterclockwise. The magnetic bias of electromagnet 17 at the time the pen is to be dropped, overcomes the spring bias and moves the pen into a position engaging the drawing board. Additional refinements in the form of pen damping facilities and mechanical limits, are of course, provided in an arrangement of this sort to provide pen engagement without damage to the pen or spilling of ink. These details are not illustrated in the interests of simplicity since they form no part of this invention.

A second transistor Q2 is also connected to the output of the amplifier ZA2. The emitter circuit of this second transistor is utilized to control several control relays yet to be described.

The collectors of both transistors Q1 and Q2, as shown, are connected to a −28 volt source and the emitters are connected through suitable loads such as the solenoid which actuates the pen, or through relay coils to ground. With the voltage polarities shown, the application of a positive voltage to the base of either of the transistors cuts these transistors off and the application of a negative voltage of suitable magnitude results in conduction of these transistors. To avoid driving the transistors excessively into saturation a Zener diode D9 may be connected between the base circuits and ground, as indicated, to provide a negative voltage clamp preventing excursions beyond a desired negative value.

The input to amplifier ZA2 is additionally controlled, when relay K8 is de-energized, by a −28 volt supply which is applied by contacts K8*b* through resistors R14 and R15 to the input of the amplifier. In view of the fact that the pen is spring loaded to retracted position the pen up signal is represented in de-energization of the transistors Q1 and Q2, de-energization of transistor Q1 maintaining the coil of the pen solenoid de-energized. This requires a positive voltage on the base of the transistors which means that the amplifier ZA2 must have an electrical output which is high. The −28 volt bias at the input cuts this amplifier off with the net result that it is switched to the higher of the two voltage states, that is, approximately 28 volts, which in this situation applies a cutoff bias to the base of both of the transistors Q1 and Q2.

Amplifier ZA2 also has a small positive bias applied to its input circuit by means of a bias circuit including resistors R16, R17 and grounded resistor R18. This bias circuit is connected between +300 volts and the input circuit for amplifier ZA2. In the absence of other bias voltages this bias circuit triggers the amplifier ZA2 to its negative output voltage state.

A holdoff bias which is the negative voltage output of diode bridge D3 is applied to amplifier ZA2 during the slewing mode of operation. During slewing, relay K10 is de-energized and contacts K10*a* connect the rectified negative error voltage through a circuit including a polarizing diode D10 and calibrating resistor R19 to the input circuit of amplifier ZA2. This holdoff voltage swings from a negative value, determined by the maximum servo error voltage XE or YE, toward ground or zero volts. The RC time constant of this circuit is such as to permit several excursions of the error voltage through zero prior to the time that amplifier ZA2 is switched by the predominating positive bias of bias network R16, R17, R18 as zero holdoff bias is approached. This delayed holdoff voltage allows the servo and the pen to settle in line start position prior to switching of the amplifier ZA2 to its negative output voltage state to initiate the production of the pen downsignal at transistor Q1.

The operation of this pen control circuit PCC is briefly described at this point without reference to specific controns of certain of the relays K8, K9, K10, K11 and K111 which are involved. In this operation it is assumed that power supplies have been turned on but that the system has not been started.

Under the circumstances above, relays K8 and K11 are de-energized. Contacts K8*b* are closed and connect −28 volts through resistors R14 and R15 to the input circuits of amplifier ZA2. This amplifier is therefore switched to the higher of its two output voltage states producing a positive bias at the base of transistors Q1 and Q2 so that these transistors are cut off. Since relay K11 is de-energized contacts K11*c* are open and the output of amplifier ZA is not coupled to the input of amplifier ZA2. When the system is started relay K8 is energized closing contacts K8*c* and K8*d* connecting the ladder attenuator circuits with the input circuits of the summing amplifier XSA and YSA. Assuming that the ladder attenuators have been set, the voltages which are summed by the respective amplifiers for a straight line, for instance, include the voltages $E_\alpha$ and $E_{A1}$ for the X coordinate of the starting point of the line and the voltage $E_\beta+E_{B2}$ for the Y coordinate of the line. Relay K111 is also de-energized at this time and contacts K111*a* are open. Relay K7 in the function generator controlled by contacts K111*a* is de-energized and the function generator is caged. The application of these fixed voltages to the inputs of the respective summing amplifiers results in large error voltages across resistors XR and YR constituting the chopper circuit input. The servo motors run at high speed, slewing the pen into pen start position under the influence of the algebraic sum of the input voltages at the summing amplifier.

Relay K10 is also deenergized and contacts K10*a* couple the output of the diode bridge D3 through diode D10 and the resistor R19 to the input of amplifier A2. This negative voltage replaces the negative voltage previously applied by contacts K8*b* which are now open and is instrumental in holding amplifier ZA2 in its high voltage output state, preventing the generation of a pen down signal. When the pen is properly positioned and the holdoff voltage has decayed sufficiently the net positive bias resulting from the bias network R16, R17, R18 switches the amplifier ZA2 to the other of its two stable states negatively biasing the bases of transistors Q1 and Q2 and causing conduction. This generates the pen down signal and the pen engages the paper. This pen down signal energizes relay K11, contacts K11*c* connect the output circuits of amplifier ZA to the input circuits of the amplifier ZA2, networks K11*d* energize relay K7 and the function generator operates.

If a straight line is to be drawn, the voltage $E_z$, the output of summing junction ZJ, is a negative sine wave voltage. Depending upon the state of the amplifier ZA at the instant the voltage $E_z$ is supplied there the negative going excursion may switch the amplifier positive. The differentiating circuit C7, R12 produces a positive voltage pulse at the time the amplifier ZA is switched. Since amplifier ZA2 is already conducting and its output low this positive voltage pulse at its input has no effect. The time varying voltages which are applied to the X and Y summing amplifiers result in operation of the servos in the drawing mode, so that the pen describes a line defined by the time varying input voltages.

At the time the voltage $E_z$ goes through zero from negative to positive the amplifier ZA is switched so that its output goes negative. The negative pulse is coupled to the input of amplifier ZA2 by the differentiating network as amplifier ZA switches and cuts off the transistors Q1 and Q2, lifting the pen.

At this point reference must be made to the input bias provided on the amplifier ZA by the anticipate circuit. This has been previously described and is produced in the attenuator network RA3 in FIG. 35 which is set by the function generator frequency setting relays K1 through K5. This anticipate bias voltage produced by this network prior to connection of the output circuits of amplifier ZA to the input circuits of amplifier ZA2 has switched the output circuit of the amplifier ZA to its positive bistable voltage state. Hence, under these circumstances the input of the negative sine wave voltage $E_z$ effects no change in the output of the amplifier ZA. Consequently, there is no coupling of a signal into the input circuits of amplifier ZA2. As the line terminating voltage sweeps through zero from negative to positive the amplifier is suddenly switched from its positive output voltage state to its negative output voltage state. A negative going voltage pulse is produced by the differentiating circuit in the input circuits of the amplifier ZA2. The amplifier ZA2 now switches to its positive bistable output voltage state and cuts off the transistors Q1 and Q2.

Cut off of transistor Q1 terminates the pen down signal and the pen is lifted.

Attention is directed to the fact that the circuits as arranged herein utilize cosine varying voltages on both the X and the Y servos in the generation of straight lines. This is advantageous in that the rate of change of the servo voltage is low, both at the beginning and at the end of the line. Hence, the servos accelerate the pen slowly and smoothly from zero speed through maximum line drawing speed and then as the end of the line is approached, gradually decelerate the pen. The line is drawn smoothly and the line is drawn straight since the servos are not confronted with rapid voltage changes. The use of the cosine voltages is additionally advantageous in effecting the termination of a line. Here again since the rate of change of voltage is approaching zero at the end of the line, the servo speed is correspondingly low. Hence, the occurrence of zero in the line terminating voltage, proceeding from negative to positive, is highly effective in precisely terminating the line at its end point.

Thus, in accordance with this invention, there has been described a circuit operable in a drafting machine for controlling a drawing pen to lift from a drawing surface so as to terminate a line at a desired time. A time varying terminating function is combined with an anticipate bias to develop a pen lift signal which is applied to a pen lift device at a time which is proportional to the speed of pen movement. The pen lift device having a fixed time delay thus responds to lift the pen and draw lines having lengths independent of pen speed.

Although but one embodiment of this invention has been described herein it will be appreciated by those skilled in the art that numerous changes may be made in certain organizational aspects hereof and that numerous changes may be made in the details of circuits which are employed herein to achieve the stated results. It is therefore intended that the foregoing disclosure and the showing made in the drawing shall be considered only as illustrative of the principles of this invention and are not to be construed in a limiting sense.

What is claimed is:

1. A drafting machine, comprising:

a function generator having a sine voltage output circuit and a cosine voltage output circuit;

frequency control means coupled to said function generator to control the frequency thereof;

a plotter having X input means and Y input means coupled to at least one of said output circuits and having a single output member coupled to both of said X input means and said Y input means and controlled thereby;

a line drawing device supported by said output member for movement between line drawing and inoperative positions;

first and second amplitude modulation means coupled to said sine voltage output circuit and said cosine voltage output circuit, respectively;

summing means coupled to said first and said second amplitude modulation means for producing a time varying line terminating voltage changed from one predetermined polarity to the other at line termination;

drawing device control means having an input circuit coupled to said summing means and having an output means coupled to said drawing device for holding said drawing device in line drawing position and for responding to said time varying line terminating voltage changing from said one polarity to the other to move said drawing device to inoperative position;

and anticipate means coupled to said input circuit of said drawing device control means and to said frequency control means and controlled by said frequency control means for developing a bias voltage in dependence upon the frequency of the voltage output of said function generator.

2. A system for moving a drawing device from a line drawing position to an inoperative position for terminating drawing of a line, comprising:

a source of first and second time varying voltages having a selected common frequency;

frequency control circuit means coupled to said source for varying the frequency thereof to control the length of a line to be drawn;

first and second drawing device control means coupled to said source of first and second time varying voltages and to said drawing device for respectively responding to said first and second time varying voltages to move said drawing device;

line terminating control means coupled to said source and energized by said first and said second time varying voltages for producing a line terminating voltage changing from one polarity to the other polarity at a desired line terminating time, in response to said first and said second time varying voltages;

a first bistable amplifier having an input circuit coupled to said line terminating control means and having an output circuit;

a capacitor coupled to said output circuit of said first bistable amplifier;

a second bistable amplifier having an input circuit coupled to said capacitor and having an output circuit;

switching means coupled between said capacitor and said input circuit of said second bistable amplifier and being open for a predetermined period after said first and said second time varying voltages are applied to said first and said second drawing device control means for drawing a line;

drawing device lift means coupled between said output circuit of said second bistable amplifier and said drawing device;

means copled to said input circuit of said second bistable amplifier for setting said second bistable amplifier to a first electrical state prior to a line drawing operation, said first bistable amplifier responding to the initial first or second polarity of said line terminating voltage to be set to a first or second electrical state before said switching means closes;

and anticipate circuit means coupled between said frequency control circuit means and said input circuit of said first bistable amplifier for providing anticipate bias in dependence upon the frequency of said first and said second time varying voltages.

3. A drafting machine, comprising:

a shift register containing line information signals, first and second line terminating signals, and first and second line terminating sign signals;

oscillator means producing positive and negative sine and cosine voltages of fixed magnitude having a common frequency and having first and second variable frequency time constant integrators including respective first and second attenuation networks;

attenuation network control means coupled to said shift register to be controlled by said line information signals and coupled to said attenuation networks for controlling the frequency of said oscillator means;

line generator ladder network means having ladder network control means coupled to said shift register to be controlled by said line information signals and having input circuit means coupled to said oscillator means to be energized thereby for producing X and Y time varying line generating voltages;

X and Y control means coupled to said line generating ladder network means for respectively responding to said X and Y time varying line generating voltages;

an output member coupled to both of said X and Y control means and controlled thereby;

a drawing device movably supported by said output member for movement between line drawing and inoperative positions;

first and second line terminating ladder network means having respective ladder network control means coupled to said shift register for respectively receiving and being controlled by said first and said second line terminating signals;

first switch means, including switch control means, coupled between said oscillator means and said first line terminating ladder network means, for selectively applying said positive and negative sine voltages to said first line terminating ladder network means;

second switch means, including switch control means, coupled between said oscillator means and said second line terminating ladder network means for selectively applying said positive and negative cosine voltages to said second line terminating ladder network means;

circuit means coupling said switch control means of each of said first and said second switch means to said shift register to be controlled by said first and said second line terminating sign signals, respectively;

summing means coupled to said first and said second line terminating ladder network means for developing a line terminating voltage changing from one polarity to the other at a selected time;

a first bistable amplifier having an input circuit coupled to said summing means and having an output circuit;

a capacitor coupled to said output circuit of said first bistable amplifier;

a second bistable amplifier having an input circuit coupled to said capacitor and having an output circuit;

means coupled to said input circuit of said second bistable amplifier for setting the same to a first state prior to drawing a line;

drawing device control means coupled between said second bistable amplifier and said drawing device for holding said drawing device in said line drawing position and for moving said drawing device to said inoperative position at the end of the line;

an anticipate bias attenuation network coupled to said attenuation network control means to be controlled in dependence upon said line information signals;

and circuit means coupling said anticipate bias attenuation network to said input circuit of said first bistable amplifier.

4. In a system for controlling a plotter having a pair of input circuit means and having a single output member coupled to and controlled by both of said input circuit means and further having a drawing device supported on said output member and movable between line drawing and inoperative positions, the combination comprising:

a generator having a sine voltage output circuit and a cosine voltage output circuit;

frequency control means coupled to said generator for controlling the frequency thereof;

circuit means coupling one output circuit of said generator to one of said pair of input circuit means of said plotter;

circuit means selectively coupling the sine voltage output circuit or the cosine voltage output circuit of said generator to the other of said pair of input circuit means of said plotter;

line terminating circuit means coupled to said sine voltage output circuit and to said cosine voltage output circuit and producing a line terminating voltage;

drawing device control means having an input circuit coupled to said line terminating circuit means and receiving said line terminating voltage and having output means coupled to said drawing device to control said drawing device;

anticipate circuit means coupled to said input circuit of said drawing device control means;

and anticipate circuit control means having output means coupled to and controlling said anticipate circuit means and having input means coupled to and controlled by said frequency control means.

5. Apparatus as set forth in claim 4 in which said anticipate circuit means comprises a variable impedance circuit.

6. Apparatus as set forth in claim 4 in which said anticipate circuit means comprises an electrical impedance device and said frequency control means comprises switches coupled to and controlling the impedance of said electrical impedance device.

References Cited in the file of this patent

UNITED STATES PATENTS 2,707,143 Ingledue ---------------- Apr. 26, 1955
2,829,329 Silva ------------------- Apr. 1, 1958

UNITED STATES PATENT OFFICE

CERTIFICATE OF CORRECTION

Patent No. 3,148,451 September 15, 1964

John R. Morris et al.

It is hereby certified that error appears in the above numbered patent requiring correction and that the said Letters Patent should read as corrected below.

Column 5, line 33, for "W" read -- Y --; column 9, line 13, for "point of" read -- point on --; line 20, after "functions" insert -- sin --; line 34, for "In this" read -- $\theta$ in this --; column 23, line 6, for "downsignal" read -- down signal --; column 25, line 61, for "copled" read -- coupled --.

Signed and sealed this 3rd day of May 1966.

(SEAL)

Attest:

ERNEST W. SWIDER

Attesting Officer

EDWARD J. BRENNER

Commissioner of Patents